United States Patent
Archer et al.

(10) Patent No.: US 12,187,282 B2
(45) Date of Patent: Jan. 7, 2025

(54) CONDITION BASED VEHICLE PERFORMANCE MANAGEMENT

(71) Applicant: Oshkosh Corporation, Oshkosh, WI (US)

(72) Inventors: David Archer, Oshkosh, WI (US); Paul Baierl, Oshkosh, WI (US); Jeromie Johnston, Oshkosh, WI (US); Eric Linsmeier, Oshkosh, WI (US); Jonathan Ropella, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 212 days.

(21) Appl. No.: 17/824,141

(22) Filed: May 25, 2022

(65) Prior Publication Data

US 2022/0379892 A1 Dec. 1, 2022

Related U.S. Application Data

(60) Provisional application No. 63/193,418, filed on May 26, 2021.

(51) Int. Cl.
*B60W 30/18* (2012.01)
*B60Q 1/50* (2006.01)
(Continued)

(52) U.S. Cl.
CPC ......... *B60W 30/18154* (2013.01); *B60Q 1/50* (2013.01); *B60W 10/04* (2013.01);
(Continued)

(58) Field of Classification Search
CPC ........... B60W 30/18154; B60W 10/04; B60W 10/10; B60W 30/18159; B60W 40/105; B60W 40/12; B60W 2540/229; B60W 30/146; B60W 2030/082; B60W 2530/20; B60W 2555/20; B60W 2556/50; B60W 2710/0644; B60W 10/06; B60W 10/182; B60W 30/188; B60Q 1/50; B60Q 1/1407; B60Q 2800/20; B60Q 1/26; B60Q 1/2611;
(Continued)

(56) References Cited

U.S. PATENT DOCUMENTS 5,818,121 A * 10/1998 Krappel ................ B60K 28/14
180/281
8,180,527 B2 * 5/2012 Mueller-Schneiders ....................
B60R 16/0237
701/37

(Continued)

FOREIGN PATENT DOCUMENTS

CN 103108770 A * 5/2013 ................ B60L 1/00
CN 104314640 A * 1/2015 ............. F01M 11/12
(Continued)

*Primary Examiner* — B M M Hannan
(74) *Attorney, Agent, or Firm* — Foley & Lardner LLP

(57) ABSTRACT

A vehicle includes a chassis, a driveline coupled to the chassis, and a control system. The control system is configured to monitor a condition of at least one of the vehicle, an area around the vehicle, or an operator of the vehicle; and control operation of the driveline based on the condition. Controlling the operation of the driveline includes at least one of limiting a speed at which the driveline drives the vehicle or shutting down the driveline and isolating a component of the driveline.

19 Claims, 8 Drawing Sheets

(51) Int. Cl.
   *B60W 10/04* (2006.01)
   *B60W 10/10* (2012.01)
   *B60W 40/105* (2012.01)
   *B60W 40/12* (2012.01)

(52) U.S. Cl.
   CPC ...... *B60W 10/10* (2013.01); *B60W 30/18159* (2020.02); *B60W 40/105* (2013.01); *B60W 40/12* (2013.01); *B60W 2540/229* (2020.02)

(58) Field of Classification Search
   CPC .............. B60Q 5/005; B60K 2028/006; B60K 28/06; B60K 28/14; F02D 41/021; F02D 31/006; F02D 2200/101; F02D 2200/501; F02D 2200/70; F02D 2200/701; F02D 2200/702; F02N 11/0833; F02N 2200/0805
   USPC .......................................................... 701/99
   See application file for complete search history.

(56) References Cited

U.S. PATENT DOCUMENTS

| | | | |
|---|---|---|---|
| 8,388,493 B2* | 3/2013 | Henneken | B60W 10/11 180/65.275 |
| 9,616,747 B1* | 4/2017 | Breed | B60W 30/146 |
| 10,056,006 B1* | 8/2018 | Hsu-Hoffman | G09B 9/052 |
| 10,556,578 B1* | 2/2020 | Van Patten | G08B 21/24 |
| 10,994,712 B2* | 5/2021 | Oba | G08G 1/0965 |
| 11,380,196 B1* | 7/2022 | Dorsey | G08G 1/094 |
| 11,427,203 B1* | 8/2022 | Brown | B60W 20/50 |
| 11,472,308 B2* | 10/2022 | Messina | B60L 58/20 |
| 11,780,330 B1* | 10/2023 | Karas | B60T 17/18 180/271 |
| 2002/0066508 A1* | 6/2002 | Amyotte | B60C 27/145 152/214 |
| 2002/0166710 A1* | 11/2002 | Breed | B60R 25/25 180/282 |
| 2003/0230412 A1 | 12/2003 | Archer | |
| 2003/0230863 A1 | 12/2003 | Archer | |
| 2004/0034457 A1* | 2/2004 | Stam | G06V 20/584 701/49 |
| 2004/0039510 A1 | 2/2004 | Archer et al. | |
| 2005/0001400 A1 | 1/2005 | Archer et al. | |
| 2005/0234622 A1* | 10/2005 | Pillar | B65F 3/043 701/41 |
| 2006/0021764 A1 | 2/2006 | Archer et al. | |
| 2006/0022001 A1 | 2/2006 | Linsmeier et al. | |
| 2006/0032701 A1 | 2/2006 | Linsmeier et al. | |
| 2006/0032702 A1 | 2/2006 | Linsmeier et al. | |
| 2006/0065411 A1 | 3/2006 | Linsmeier et al. | |
| 2006/0086566 A1 | 4/2006 | Linsmeier et al. | |
| 2006/0180322 A1 | 8/2006 | Archer et al. | |
| 2007/0247332 A1* | 10/2007 | Halishak | G08G 1/0965 340/902 |
| 2010/0222973 A1* | 9/2010 | Senda | B60W 30/192 701/68 |
| 2010/0289238 A1 | 11/2010 | Archer et al. | |
| 2011/0109475 A1* | 5/2011 | Basnayake | G08G 1/096791 340/902 |
| 2012/0018240 A1* | 1/2012 | Grubaugh | B62D 51/02 701/70 |
| 2012/0133528 A1* | 5/2012 | Lee | A61B 5/18 340/945 |
| 2013/0088369 A1* | 4/2013 | Yu | G08B 21/06 340/905 |
| 2014/0246265 A1 | 9/2014 | Archer et al. | |
| 2015/0096819 A1* | 4/2015 | Grajkowski | F02D 41/021 180/170 |
| 2015/0321657 A1* | 11/2015 | Lasson | B60L 3/003 180/65.265 |
| 2016/0104327 A1* | 4/2016 | Ghannam | B60W 50/0205 701/29.2 |
| 2016/0144211 A1 | 5/2016 | Betz et al. | |
| 2016/0145941 A1 | 5/2016 | Betz et al. | |
| 2016/0267335 A1* | 9/2016 | Hampiholi | B60W 50/14 |
| 2016/0304051 A1 | 10/2016 | Archer et al. | |
| 2017/0011562 A1* | 1/2017 | Hodges | G09B 29/007 |
| 2017/0061812 A1* | 3/2017 | Lahav | G06Q 40/08 |
| 2017/0178503 A1* | 6/2017 | Gross | G08G 1/087 |
| 2017/0236412 A1* | 8/2017 | Gross | G08G 1/0965 701/301 |
| 2017/0316687 A1* | 11/2017 | Gross | G08G 1/164 |
| 2018/0061230 A1* | 3/2018 | Madigan | G08G 1/0112 |
| 2018/0215354 A1 | 8/2018 | Linsmeier et al. | |
| 2018/0215597 A1 | 8/2018 | Linsmeier et al. | |
| 2018/0238254 A1* | 8/2018 | Titus | B62D 25/12 |
| 2018/0297597 A1 | 10/2018 | Linsmeier et al. | |
| 2019/0106083 A1 | 4/2019 | Archer et al. | |
| 2019/0143981 A1* | 5/2019 | Naserian | F02N 11/0837 701/55 |
| 2019/0176687 A1* | 6/2019 | Nagata | B60W 40/13 |
| 2019/0262646 A1 | 8/2019 | Linsmeier et al. | |
| 2019/0263408 A1 | 8/2019 | Linsmeier et al. | |
| 2019/0327596 A1* | 10/2019 | Jackson | G08B 27/001 |
| 2019/0359184 A1 | 11/2019 | Linsmeier et al. | |
| 2019/0359460 A1 | 11/2019 | Linsmeier et al. | |
| 2019/0367029 A1* | 12/2019 | Martinez Ruvalcaba | B60W 50/082 |
| 2019/0367050 A1* | 12/2019 | Victor | G06V 20/597 |
| 2020/0038700 A1 | 2/2020 | Betz et al. | |
| 2020/0039804 A1 | 2/2020 | Betz et al. | |
| 2020/0047013 A1 | 2/2020 | Betz et al. | |
| 2020/0056426 A1 | 2/2020 | Betz et al. | |
| 2020/0130653 A1 | 4/2020 | Betz et al. | |
| 2020/0172088 A1* | 6/2020 | Dudar | G01C 21/3453 |
| 2020/0216064 A1* | 7/2020 | du Toit | G06N 20/00 |
| 2020/0231131 A1 | 7/2020 | Archer et al. | |
| 2020/0242924 A1* | 7/2020 | Publicover | G08G 1/087 |
| 2020/0290630 A1* | 9/2020 | Elwart | B60W 40/08 |
| 2020/0293034 A1* | 9/2020 | Shibata | G01M 17/007 |
| 2020/0293796 A1* | 9/2020 | Sajjadi Mohammadabadi | B60W 30/095 |
| 2020/0294401 A1* | 9/2020 | Kerecsen | G07C 5/008 |
| 2020/0307578 A1* | 10/2020 | Magolan | B60W 10/22 |
| 2020/0317083 A1* | 10/2020 | Messina | B28C 5/4227 |
| 2021/0138999 A1* | 5/2021 | Thomas | G06V 20/59 |
| 2021/0178206 A1 | 6/2021 | Betz et al. | |
| 2021/0209922 A1* | 7/2021 | Yang | B60W 40/09 |
| 2021/0229628 A1 | 7/2021 | Archer et al. | |
| 2021/0244982 A1 | 8/2021 | Betz et al. | |
| 2021/0253102 A1 | 8/2021 | Linsmeier et al. | |
| 2022/0009761 A1 | 1/2022 | Archer et al. | |
| 2022/0017048 A1 | 1/2022 | Betz et al. | |
| 2022/0024425 A1 | 1/2022 | Linsmeier et al. | |
| 2022/0074417 A1 | 3/2022 | Linsmeier et al. | |
| 2022/0112060 A1 | 4/2022 | Archer et al. | |
| 2022/0112061 A1 | 4/2022 | Archer et al. | |
| 2022/0174866 A1* | 6/2022 | McCutcheon, IV | G05D 1/0278 |
| 2022/0177055 A1 | 6/2022 | Archer | |
| 2022/0242713 A1 | 8/2022 | Betz et al. | |
| 2022/0260031 A1* | 8/2022 | Li | F02M 35/024 |
| 2022/0379892 A1* | 12/2022 | Archer | B60W 30/188 |
| 2023/0026459 A1* | 1/2023 | Schnee | B62J 45/414 |

FOREIGN PATENT DOCUMENTS

| | | | | |
|---|---|---|---|---|
| CN | 111806231 A | * | 10/2020 | ............. B60K 31/00 |
| DE | 19811899 A1 | * | 9/1998 | ................ H02J 9/04 |
| DE | 102008055900 A1 | * | 6/2009 | ............ B62D 5/0469 |
| DE | 102018107040 A1 | * | 9/2018 | ............ B60W 10/04 |
| DE | 102019110802 A1 | * | 10/2020 | |
| DE | 102019120815 A1 | * | 2/2021 | |
| DE | 102020122566 A1 | * | 3/2022 | |
| DE | 102021116068 A1 | * | 12/2022 | .......... G01M 17/007 |
| EP | 1440425 B1 | * | 12/2006 | ............. G08G 1/087 |
| EP | 2314482 A2 | * | 4/2011 | ............ B60R 16/06 |
| GB | 2424110 A | * | 9/2006 | ............. G08G 1/087 |
| JP | 2001097065 A | * | 4/2001 | |
| JP | 3983324 B2 | * | 9/2007 | ........... B62D 15/025 |

(56) References Cited

FOREIGN PATENT DOCUMENTS

| JP | 2007265163 | A | * | 10/2007 | |
|----|-----------|---|---|---------|---|
| JP | 2021144386 | A | * | 9/2021 | |
| KR | 20010001379 | A | * | 1/2001 | |
| WO | WO-2019043446 | A1 | * | 3/2019 | ........... G05D 1/0287 |
| WO | WO-2022202090 | A1 | * | 9/2022 | |

* cited by examiner

CONDITION BASED VEHICLE PERFORMANCE MANAGEMENT

CROSS-REFERENCE TO RELATED PATENT APPLICATION

This application claims the benefit of and priority to U.S. Provisional Patent Application No. 63/193,418, filed May 26, 2021, which is incorporated herein by reference in its entirety.

BACKGROUND

Currently, the control of a vehicle's driveline is primarily left to the operator. However, the vehicle may encounter various conditions as it is driven where the speed of the vehicle affects the drivability thereof, as well as could impact the well-being of the operator, surrounding vehicles, pedestrians, etc.

SUMMARY

One embodiment relates to a vehicle. The vehicle includes a chassis, a driveline coupled to the chassis, and a control system. The control system is configured to monitor a condition of at least one of the vehicle, an area around the vehicle, or an operator of the vehicle; and control operation of the driveline based on the condition. Controlling the operation of the driveline includes at least one of limiting a speed at which the driveline drives the vehicle or shutting down the driveline and isolating a component of the driveline.

Another embodiment relates to a vehicle. The vehicle includes a chassis, a light system, a siren, and a control system. The control system is configured to (a) monitor a location of the vehicle to identify whether the vehicle is approaching an intersection or a high-risk area and (b) control operation of at least one of the siren or the light system differently (i) as the vehicle at least one of approaches or drives through the intersection or the high-risk area (ii) relative to another location that is not the intersection or the high-risk area.

Still another embodiment relates to a vehicle. The vehicle includes a chassis, a driveline coupled to the chassis, a light system, a siren, and a control system. The control system is configured to monitor for a plurality conditions, control operation of the driveline based on the plurality of conditions by (i) selectively limiting a speed at which the driveline drives the vehicle in response to a first condition of the plurality of conditions being present and (ii) selectively shutting down the driveline and isolating a component of the driveline in response to a second condition of the plurality of conditions being present, monitor a location of the vehicle to identify whether the vehicle is approaching an intersection or a high-risk area, and control operation of the siren and the light system differently as the vehicle at least one of approaches or drives through the intersection or the high-risk area relative to another location that is not the intersection or the high-risk area. The plurality of conditions include two or more of an accident condition of the vehicle, an overturn condition of the vehicle, a seatbelt buckle condition of an operator of the vehicle, an attentiveness condition of the operator, a tire chains condition of the vehicle, a hazard lights condition of the vehicle, an adverse weather condition around the vehicle, an approaching response vehicle condition proximate the vehicle, a hazard condition ahead of the vehicle, an upcoming turn condition ahead of the vehicle, a loaded condition of the vehicle, a response condition of the vehicle, a geofence condition around the vehicle, a service condition of the vehicle, or a pre-operation check condition of the vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
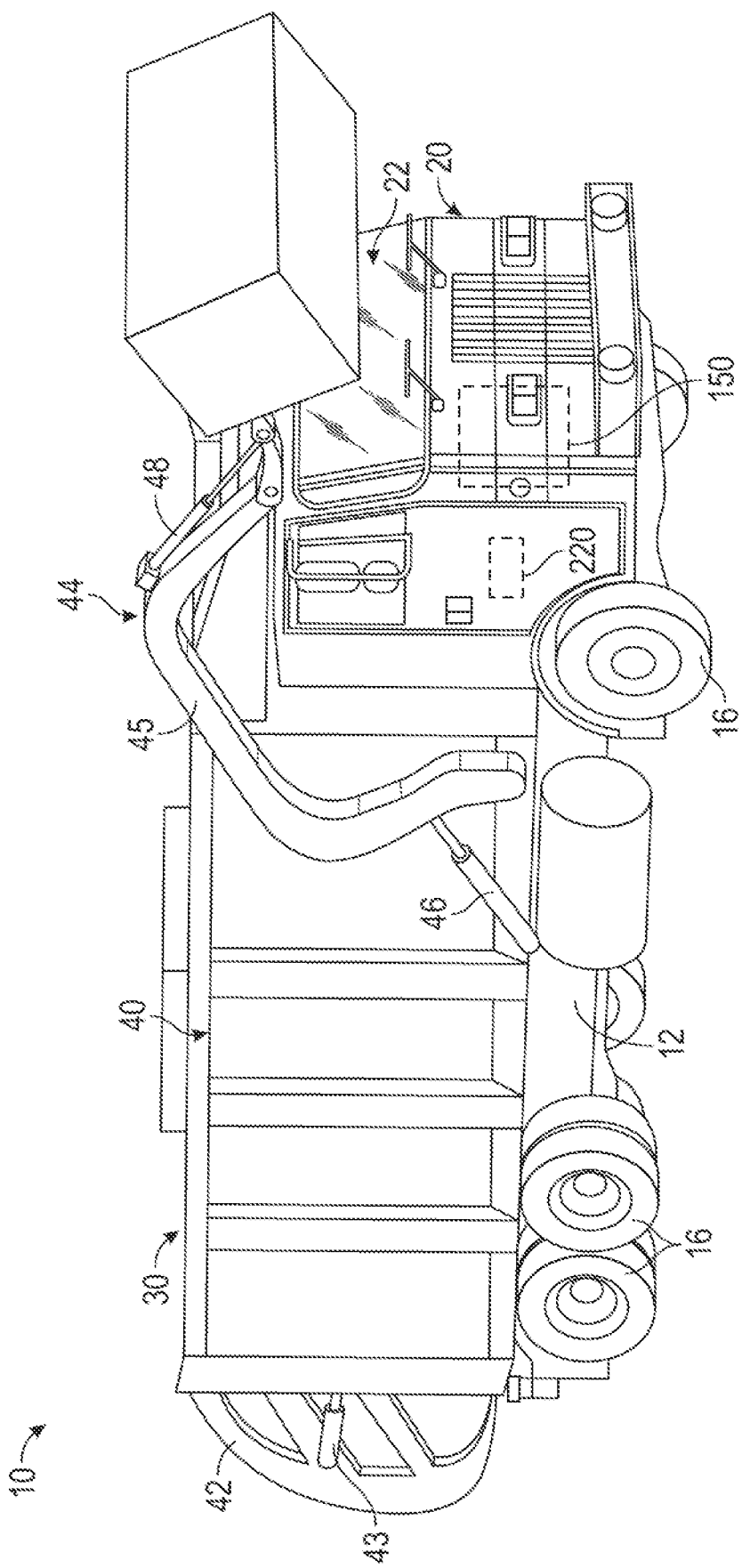
FIG. 1 is a perspective view of a refuse vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to the exemplary embodiment shown in FIGS. 1-8, a vehicle or machine, shown as vehicle 10, includes a powertrain, shown as driveline 150, and a control system, shown as control system 200. According to an exemplary embodiment, the control system 200 is configured to (i) control operation of the driveline 150 and/or (ii) provide alerts, warnings, and/or notifications regarding suggested/recommended operation of the vehicle 10 and/or suggested/recommended actions to be performed by the operator based on (a) one or more conditions that affect the drivability of the vehicle 10 (e.g., vehicle operation conditions, operational status conditions, surrounding conditions, operator conditions, etc.) and/or (b) user configurable settings.

As shown in FIGS. 1-6, the vehicle 10 includes a chassis, shown as frame 12, and a plurality of tractive elements, shown as wheel and tire assemblies 16. In other embodiments, the tractive elements include track elements. As shown in FIGS. 1-4, the vehicle 10 includes a front cabin, shown as cab 20, coupled to the frame 12 (e.g., at a front end thereof, etc.) and defining an interior, shown as interior 22, and a rear assembly, shown as rear assembly 30, coupled to the frame 12 (e.g., at a rear end thereof, etc.). The cab 20 may include various components to facilitate operation of the vehicle 10 by an operator (e.g., a seat, a steering wheel, hydraulic controls, a user interface, switches, buttons, dials, etc.).

According to the exemplary embodiment shown in FIG. 1, the vehicle 10 is configured as a front loading refuse vehicle (e.g., a garbage truck, a waste collection truck, a sanitation truck, a recycling truck, etc.). In other embodiments, the vehicle 10 is configured as a side-loading refuse truck or a rear-loading refuse truck. As shown in FIG. 1, the rear assembly 30 is configured as a rear body, shown as refuse compartment 40. According to an exemplary embodiment, the refuse compartment 40 facilitates transporting refuse from various waste receptacles within a municipality to a storage and/or processing facility (e.g., a landfill, an incineration facility, a recycling facility, etc.). By way of example, loose refuse may be placed into the refuse compartment 40 where it may thereafter be compacted. The refuse compartment 40 may provide temporary storage for refuse during transport to a waste disposal site and/or a recycling facility. In some embodiments, the refuse compartment 40 includes a hopper volume and a storage volume. Refuse may be initially loaded into the hopper volume and thereafter compacted into the storage volume. According to an exemplary embodiment, the hopper volume is positioned between the storage volume and the cab 20 (i.e., refuse is loaded into a position of the refuse compartment 40 behind the cab 20 and stored in a position further toward the rear of the refuse compartment 40). In other embodiments, the storage volume is positioned between the hopper volume and the cab 20 (e.g., in a rear-loading refuse vehicle, etc.). As shown in FIG. 1, the refuse compartment 40 includes a pivotable rear portion, shown as tailgate 42. The tailgate 42 is pivotally coupled to the refuse compartment 40 and movable between a closed orientation and an open orientation by actuators, shown as tailgate actuators 43 (e.g., to facilitate emptying the storage volume, etc.).

As shown in FIG. 1, the vehicle 10 includes a lift mechanism/system (e.g., a front-loading lift assembly, etc.), shown as lift assembly 44 having a pair of lift arms, shown as lift arms 45, coupled to the frame 12 and/or the rear assembly 30 on each side of the vehicle 10 such that the lift arms 45 extend forward of the cab 20 (e.g., a front-loading refuse vehicle, etc.). In other embodiments, the lift assembly 44 extends rearward of the rear assembly 30 (e.g., a rear-loading refuse vehicle, etc.). In still other embodiments, the lift assembly 44 extends from a side of the rear assembly 30 and/or the cab 20 (e.g., a side-loading refuse vehicle, etc.). The lift arms 45 may be rotatably coupled to the frame 12 with a pivot (e.g., a lug, a shaft, etc.). As shown in FIG. 1, the lift assembly 44 includes actuators (e.g., hydraulic cylinders, etc.), shown as lift arm actuators 46 and articulation actuators 48, coupled to the frame 12 and/or the lift arms 45. The lift arm actuators 46 are positioned such that extension and retraction thereof rotates the lift arms 45 about an axis extending through the pivot, according to an exemplary embodiment. The lift arms 45 may be rotated by the lift arm actuators 46 to lift a refuse container over the cab 20. The articulation actuators 48 are positioned to articulate the distal ends of the lift arms 45 coupled to the refuse container to assist in tipping refuse out of the refuse container into the hopper volume of the refuse compartment 40 (e.g., through an opening in the refuse compartment 40, etc.). The lift arm actuators 46 may thereafter rotate the lift arms 45 to return the empty refuse container to the ground.

Figure 2:
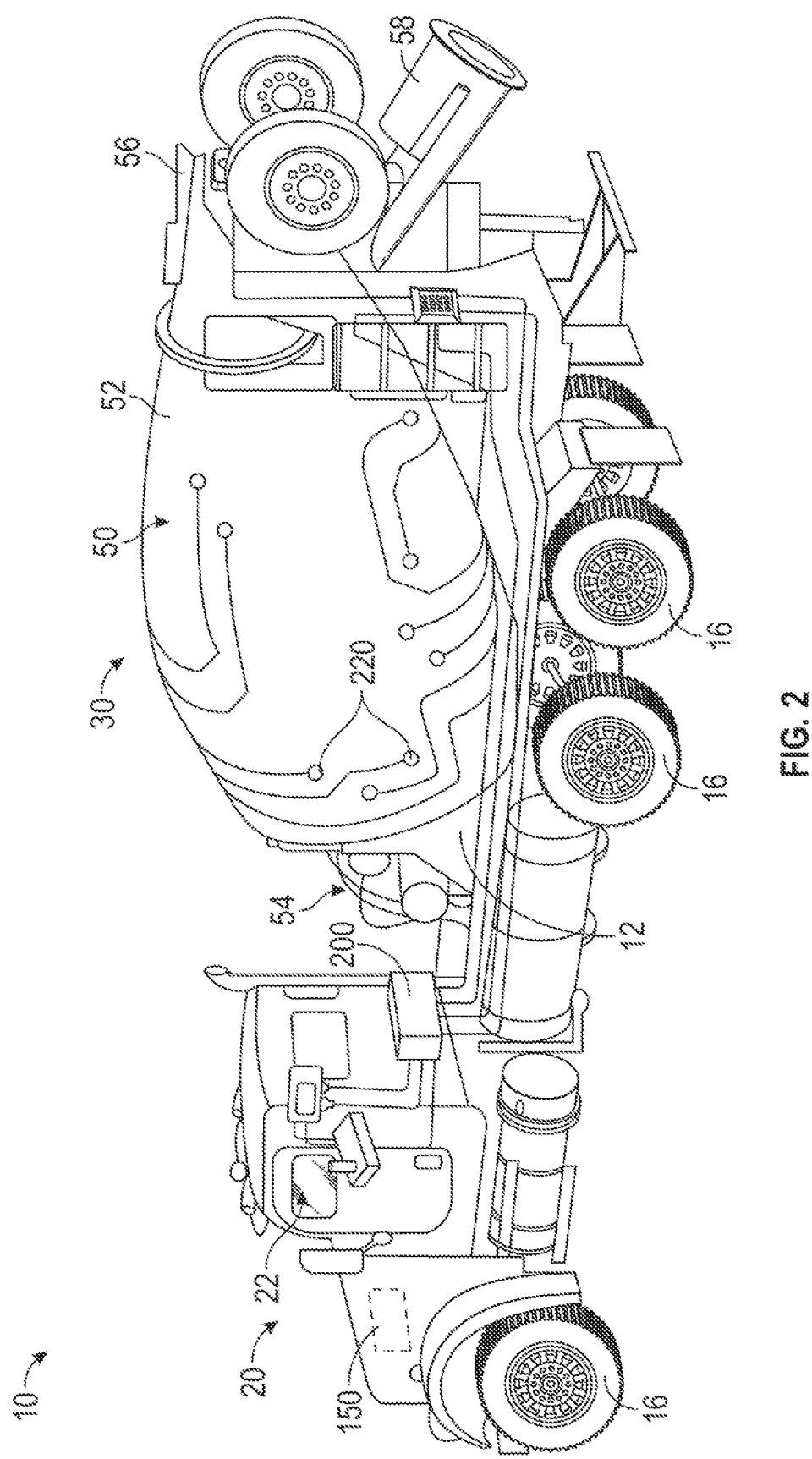
FIG. 2 is a perspective view of a mixer vehicle, according to an exemplary embodiment.

According to the exemplary embodiment shown in FIG. 2, the vehicle 10 is configured as a concrete mixer truck. As shown in FIG. 2, the rear assembly 30 of the vehicle 10 includes a concrete drum assembly, shown as drum assembly 50. According to an exemplary embodiment, the vehicle 10 is configured as a rear-discharge concrete mixing truck. In other embodiments, the vehicle 10 is configured as a front-discharge concrete mixing truck.

As shown in FIG. 2, the drum assembly 50 of the vehicle 10 includes a drum, shown as mixing drum 52. The mixing drum 52 is coupled to the frame 12 and disposed behind the cab 20 (e.g., at a rear and/or middle of the frame 12, etc.). The drum assembly 50 includes a drive system, shown as drum drive system 54, coupled to the frame 12. According to an exemplary embodiment, the drum drive system 54 is configured to selectively rotate the mixing drum 52 about a central, longitudinal axis thereof. In one embodiment, the drum drive system 54 is driven by the driveline 150. In other embodiments, the drum drive system 54 is individually powered, separate from the driveline 150 (e.g., with a motor, an independently driven actuator, etc.). According to an exemplary embodiment, the central, longitudinal axis of the mixing drum 52 is elevated from the frame 12 at an angle in the range of five degrees to twenty degrees. In other embodiments, the central, longitudinal axis is elevated by less than five degrees (e.g., four degrees, three degrees, etc.) or greater than twenty degrees (e.g., twenty-five degrees, thirty degrees, etc.). In an alternative embodiment, the vehicle 10 includes an actuator positioned to facilitate selectively adjusting the central, longitudinal axis to a desired or target angle (e.g., manually in response to an operator input/command, automatically according to a control scheme, etc.).

As shown in FIG. 2, the mixing drum 52 of the drum assembly 50 includes an inlet, shown as hopper 56, and an outlet, shown as chute 58. According to an exemplary embodiment, the mixing drum 52 is configured to receive a mixture, such as a concrete mixture (e.g., cementitious material, aggregate, sand, etc.), with the hopper 56. The mixing drum 52 may additionally include an injection port. The injection port may provide access into the interior of the mixing drum 52 to inject water and/or chemicals (e.g., air entrainers, water reducers, set retarders, set accelerators, superplasticizers, corrosion inhibitors, coloring, calcium chloride, minerals, and/or other concrete additives, etc.). According to an exemplary embodiment, the injection port includes an injection valve that facilitates injecting the water and/or the chemicals from a fluid reservoir (e.g., a water tank, etc.) into the mixing drum 52 to interact with the mixture, while preventing the mixture within the mixing drum 52 from exiting the mixing drum 52 through the injection port. The mixing drum 52 may include a mixing element (e.g., fins, etc.) positioned within the interior thereof. The mixing element may be configured to (i) agitate the contents of mixture within the mixing drum 52 when the mixing drum 52 is rotated by the drum drive system 54 in a first direction (e.g., counterclockwise, clockwise, etc.) and (ii) drive the mixture within the mixing drum 52 out through the chute 58 when the mixing drum 52 is rotated by the drum drive system 54 in an opposing second direction (e.g., clockwise, counterclockwise, etc.). The chute 58 may include an actuator positioned such that the chute 58 is selectively pivotable to reposition the chute 58 (e.g., vertically, laterally, etc.) and, therefore, an angle at which the mixture is expelled from the mixing drum 52.

Figure 3:
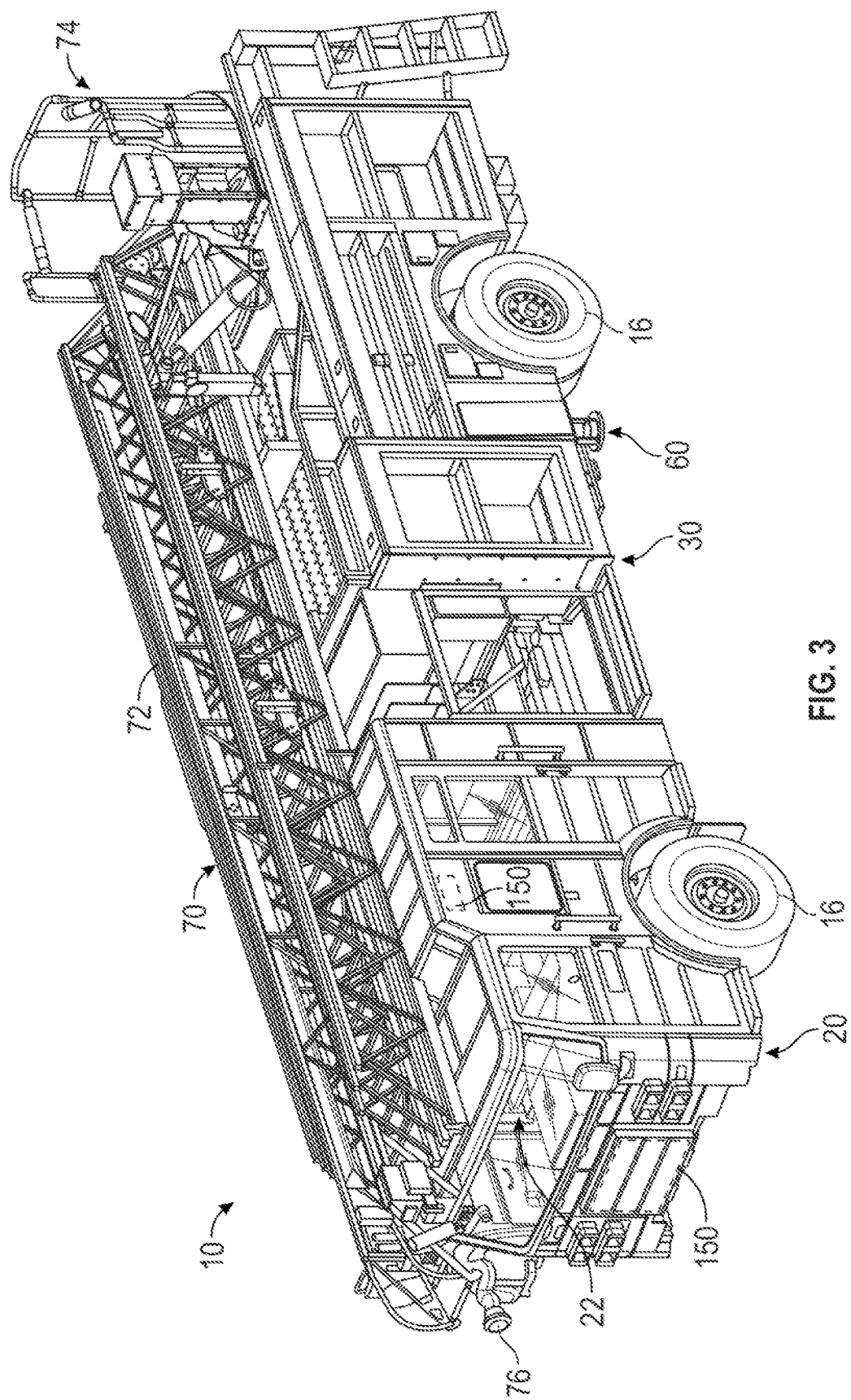
FIG. 3 is a perspective view of a fire fighting vehicle, according to an exemplary embodiment

According to the exemplary embodiment shown in FIG. 3, the vehicle 10 is configured as a response vehicle. As shown in FIG. 3, the response vehicle is a fire apparatus or fire fighting vehicle configured as a rear-mount aerial ladder truck. In another embodiment, the fire apparatus or fire fighting vehicle is configured as a mid-mount aerial ladder truck. In some embodiments, the aerial ladder truck is configured as a quint fire truck (e.g., includes on-board water storage, hose storage, a water pump, etc.). In some embodiments, the aerial ladder truck is configured as a tiller fire truck. In still another embodiment, the fire apparatus or fire apparatus is configured as a pumper fire truck (i.e., does not include an aerial ladder). In other embodiments, the vehicle 10 is configured as another type of response vehicle. By way of example, the response vehicle may be configured as a police vehicle, an ambulance, a tow truck, and/or still other vehicles used for responding to a scene (e.g., an accident, a fire, an incident, etc.).

As shown in FIG. 3, the rear assembly 30 includes stabilizers, shown as outriggers 60, and an aerial assembly, shown as ladder assembly 70. The outriggers 60 may be selectively extended from each lateral side and/or rear of the rear assembly 30 to provide increased stability while the vehicle 10 is stationary and the ladder assembly 70 is in use (e.g., extended from the vehicle 10, etc.). The rear assembly 30 further includes various compartments, cabinets, etc. that may be selectively opened and/or accessed for storage and/or component inspection, maintenance, and/or replacement.

As shown in FIG. 3, the ladder assembly 70 includes a plurality of ladder sections, shown as ladder sections 72, that are slidably coupled together such that the ladder sections 72 are extendable and retractable. The ladder assembly 70 further includes a base platform, shown as turntable 74, positioned at the base or proximal end of the ladder sections 72. The turntable 74 is configured to rotate about a vertical axis such that the ladder sections 72 may be selectively pivoted about the vertical axis (e.g., up to 360 degrees, etc.). As shown in FIG. 3, the ladder assembly 70 includes an implement, shown as water turret 76, coupled to the distal end of the ladder sections 72. The water turret 76 is configured to facilitate expelling water and/or a fire suppressing agent (e.g., foam, etc.) from a water storage tank and/or agent tank onboard the vehicle 10 and/or from an external water source (e.g., a fire hydrant, a separate water/pumper truck, etc.). In other embodiments, the ladder assembly 70 does not include the water turret 76. In such embodiments, the ladder assembly 70 may include an aerial platform coupled to the distal end of the ladder sections 72.

Figure 4:
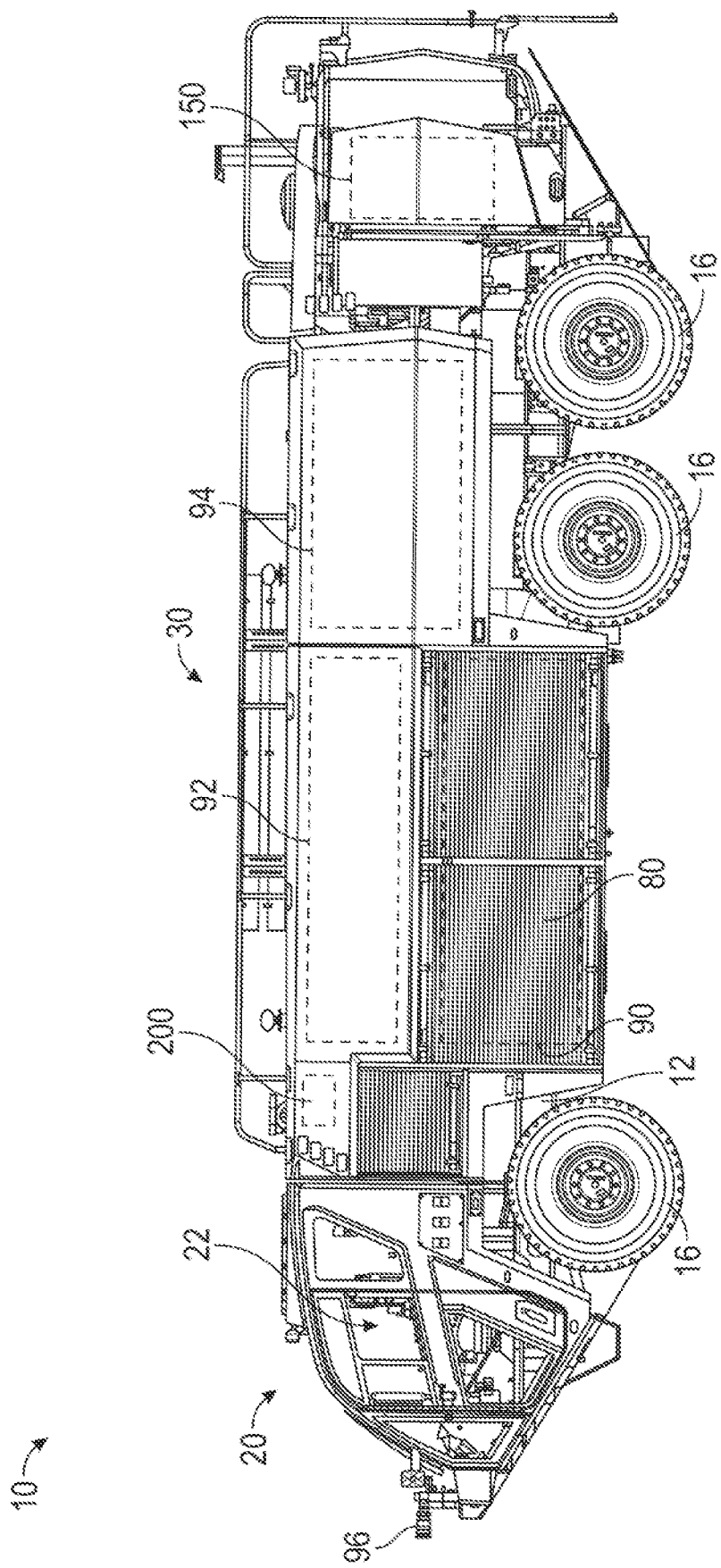
FIG. 4 is a perspective view of an airport fire fighting vehicle, according to an exemplary embodiment.

According to the exemplary embodiment shown in FIG. 4, the vehicle 10 is configured as an airport rescue fire fighting ("ARFF") truck. As shown in FIG. 4, the rear assembly 30 include compartments, shows as compartments 80. The compartments 80 may be selectively opened to access components of the vehicle 10. As shown in FIG. 4, the rear assembly 30 includes a pump system (e.g., an ultra-high-pressure pump system, etc.), shown as pump system 90, disposed within the compartments 80 of the rear assembly 30. The pump system 90 may include a high pressure pump and/or a low pressure pump coupled to a water tank 92 and/or an agent tank 94. The pump system 90 is configured to pump water and/or a fire suppressing agent from the water tank 92 and the agent tank 94, respectively, to an implement, shown as water turret 96, coupled to the front end of the cab 20.

Figure 5:
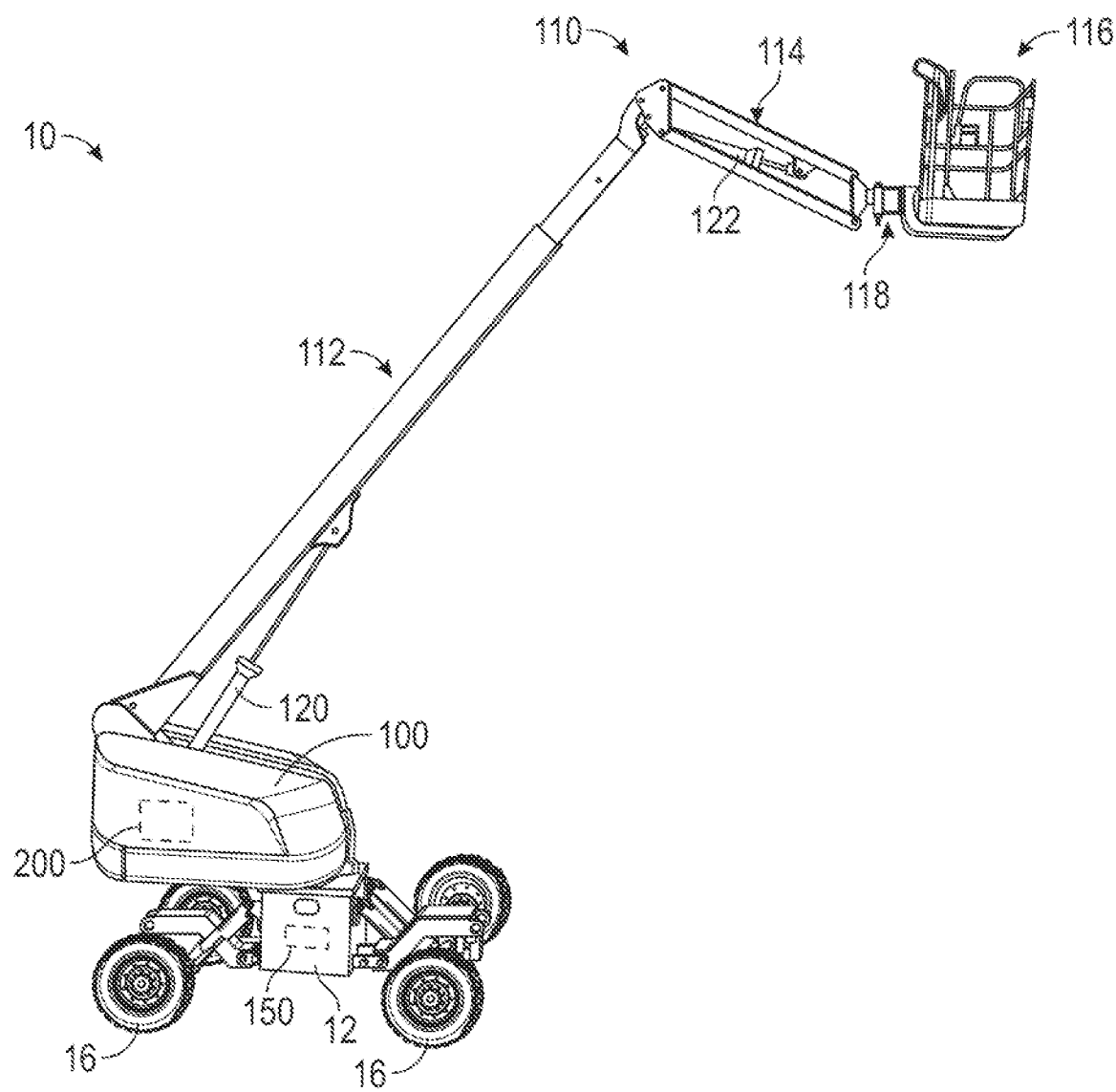
FIG. 5 is a perspective view of a lift machine, according to an exemplary embodiment.

According to the exemplary embodiment shown in FIG. 5, the vehicle 10 is configured as a lift device or machine. As shown in FIG. 5, the lift device or machine is configured as a boom lift. In other embodiments, the lift device or machine is configured as a skid-loader, a telehandler, a scissor lift, a fork lift, and/or still another lift device or machine. As shown in FIG. 5, the frame 12 supports a rotatable structure, shown as turntable 100, and a boom assembly, shown as boom 110. According to an exemplary embodiment, the turntable 100 is rotatable relative to the frame 12. According to an exemplary embodiment, the turntable 100 includes a counterweight positioned at a rear of the turntable 100. In other embodiments, the counterweight is otherwise positioned and/or at least a portion of the weight thereof is otherwise distributed throughout the vehicle 10 (e.g., on the frame 12, on a portion of the boom 110, etc.).

As shown in FIG. 5, the boom 110 includes a first boom section, shown as lower boom 112, and a second boom section, shown as upper boom 114. In other embodiments, the boom 110 includes a different number and/or arrangement of boom sections (e.g., one, three, etc.). According to an exemplary embodiment, the boom 110 is an articulating boom assembly. In one embodiment, the upper boom 114 is shorter in length than lower boom 112. In other embodiments, the upper boom 114 is longer in length than the lower boom 112. According to another exemplary embodiment, the boom 110 is a telescopic, articulating boom assembly. By way of example, the upper boom 114 and/or the lower boom 112 may include a plurality of telescoping boom sections that are configured to extend and retract along a longitudinal centerline thereof to selectively increase and decrease a length of the boom 110.

As shown in FIG. 5, the lower boom 112 has a lower end pivotally coupled (e.g., pinned, etc.) to the turntable 100 at a joint or lower boom pivot point. The boom 110 includes a first actuator (e.g., pneumatic cylinder, electric actuator, hydraulic cylinder, etc.), shown as lower lift cylinder 120. The lower lift cylinder 120 has a first end coupled to the turntable 100 and an opposing second end coupled to the lower boom 112. According to an exemplary embodiment, the lower lift cylinder 120 is positioned to raise and lower the lower boom 112 relative to the turntable 100 about the lower boom pivot point.

As shown in FIG. 5, the upper boom 114 has a lower end pivotally coupled (e.g., pinned, etc.) to an upper end of the lower boom 112 at a joint or upper boom pivot point. The boom 110 includes an implement, shown as platform assembly 116, coupled to an upper end of the upper boom 114 with an extension arm, shown as jib arm 118. In some embodiments, the jib arm 118 is configured to facilitate pivoting the platform assembly 116 about a lateral axis (e.g., pivot the platform assembly 116 up and down, etc.). In some embodiments, the jib arm 118 is configured to facilitate pivoting the platform assembly 116 about a vertical axis (e.g., pivot the platform assembly 116 left and right, etc.). In some embodiments, the jib arm 118 is configured to facilitate extending and retracting the platform assembly 116 relative to the upper boom 114. As shown in FIG. 5, the boom 110 includes a second actuator (e.g., pneumatic cylinder, electric actuator, hydraulic cylinder, etc.), shown as upper lift cylinder 122. According to an exemplary embodiment, the upper lift cylinder 122 is positioned to actuate (e.g., lift, rotate, elevate, etc.) the upper boom 114 and the platform assembly 116 relative to the lower boom 112 about the upper boom pivot point.

According to an exemplary embodiment, the platform assembly 116 is a structure that is particularly configured to support one or more workers. In some embodiments, the platform assembly 116 includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly 116 includes a control panel (e.g., a user interface, a removable or detachable control panel, etc.) to control operation of the vehicle 10 (e.g., the turntable 100, the boom 110, etc.) from the platform assembly 116 and/or remotely therefrom. In some embodiments, the control panel is additionally or alternatively coupled (e.g., detachably coupled, etc.) to the frame 12 and/or the turntable 100. In other embodiments, the platform assembly 116 includes or is replaced with an accessory and/or tool (e.g., forklift forks, etc.).

Figure 6:
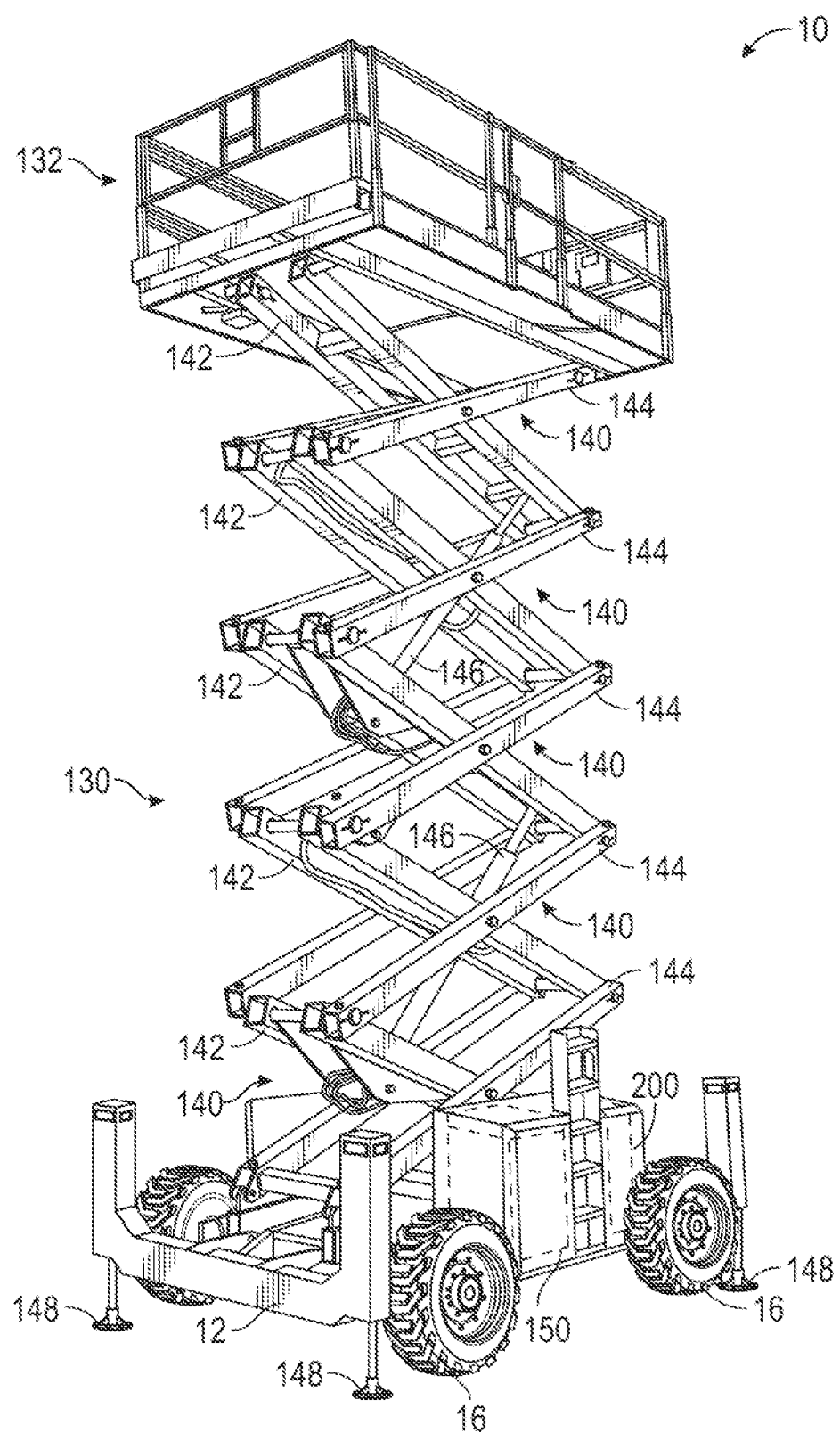
FIG. 6 is a perspective view of a lift machine, according to another exemplary embodiment.

According to the exemplary embodiment shown in FIG. 6, the vehicle 10 is configured as a scissor lift. As shown in FIG. 6, the vehicle 10 includes a lift system (e.g., a scissor assembly, etc.), shown as lift assembly 130, that couples the frame 12 to a platform, shown as platform 132. The frame 12 supports the lift assembly 130 and the platform 132, both of which are disposed directly above the frame 12. In use, the lift assembly 130 extends and retracts to raise and lower the platform 132 relative to the frame 12 between a lowered position and a raised position.

As shown in FIG. 6, the vehicle 10 includes one or more actuators, shown as leveling actuators 148, coupled to each corner of the frame 12. According to an exemplary embodiment, the leveling actuators 148 extend and retract vertically between a stored position and a deployed position. In the stored position, the leveling actuators 148 are raised and do not contact the ground. In the deployed position, the leveling actuators 148 contact the ground, lifting the frame 12. The length of each of the leveling actuators 148 in their respective deployed positions may be varied to adjust the pitch (i.e., rotational position about a lateral axis) and the roll (i.e., rotational position about a longitudinal axis) of the frame 12. Accordingly, the lengths of the leveling actuators 148 in their respective deployed positions may be adjusted such that the frame 12 is leveled with respect to the direction of gravity, even on uneven or sloped terrains. The leveling actuators 148 may additionally lift the wheel and tire assemblies 16 off the ground, preventing inadvertent driving of the vehicle 10. In other embodiments, the vehicle 10 does not include the leveling actuators 148.

As shown in FIG. 6, the lift assembly 130 includes a number of subassemblies, shown as scissor layers 140. Each of the scissor layers 140 includes a first member, shown as inner member 142, and a second member, shown as outer member 144. In each scissor layer 140, the outer member 144 receives the inner member 142. The inner member 142 is pivotally coupled to the outer member 144 near the centers of both the inner member 142 and the outer member 144. Accordingly, the inner members 142 pivot relative to the outer members 144 about a lateral axis. The scissor layers 140 are stacked atop one another to form the lift assembly 130. Each inner member 142 and each outer member 144 has a top end and a bottom end. The bottom end of each inner member 142 is pivotally coupled to the top end of the outer member 144 immediately below it, and the bottom end of each outer member 144 is pivotally coupled to the top end of the inner member 142 immediately below it. Accordingly, each of the scissor layers 140 is coupled to one another such that movement of one scissor layer 140 causes a similar movement in all of the other scissor layers 140. The bottom ends of the inner member 142 and the outer member 144 belonging to the lowermost of the scissor layers 140 are coupled to the frame 12. The top ends of the inner member 142 and the outer member 144 belonging to the uppermost of the scissor layers 140 are coupled to the platform 132. Scissor layers 140 may be added to or removed from the lift assembly 130 to increase or decrease, respectively, the maximum height that the platform 132 is configured to reach.

As shown in FIG. 6, the lift assembly 130 includes one or more actuators (e.g., hydraulic cylinders, pneumatic cylinders, motor-driven leadscrews, etc.), shown as lift actuators 146, that are configured to extend and retract the lift assembly 130. The lift actuators 146 are pivotally coupled to an inner member 142 at one end and pivotally coupled to another inner member 142 at the opposite end. These inner members 142 belong to a first scissor layer 140 and a second scissor layer 140 that are separated by a third scissor layer 140. In other embodiments, the lift assembly 130 includes more or fewer lift actuators 146 and/or the lift actuators 146 are otherwise arranged. The lift actuators 146 are configured to actuate the lift assembly 130 to selectively reposition the platform 132 between the lowered position where the platform 132 is proximate the frame 12 and the raised position where the platform 132 is at an elevated height. In some embodiments, extension of the lift actuators 146 moves the platform 132 vertically upward (extending the lift assembly 130), and retraction of the linear actuators moves the platform 132 vertically downward (retracting the lift assembly 130). In other embodiments, extension of the lift actuators 146 retracts the lift assembly 130, and retraction of the lift actuators 146 extends the lift assembly 130. In some embodiments, the outer members 144 are approximately parallel and/or contacting one another when with the lift assembly 130 in a stored position. The vehicle 10 may include various components to drive the lift actuators 146 (e.g., pumps, valves, compressors, motors, batteries, voltage regulators, etc.).

While various types of vehicle have been described herein with respect to FIGS. 1-6, it should be understood that the present disclosure similarly applies to other types of vehicles. For example, the vehicle 10 may be a military vehicle, a delivery vehicle, a mail vehicle, a boom truck, a plow truck, a farming machine or vehicle, a construction machine or vehicle, a bus (e.g., a coach bus, a school bus, a public transit bus, etc.), a semi-truck, a passenger or work vehicle (e.g., a sedan, a SUV, a truck, a van, etc.), and/or still another vehicle.

Figure 7:
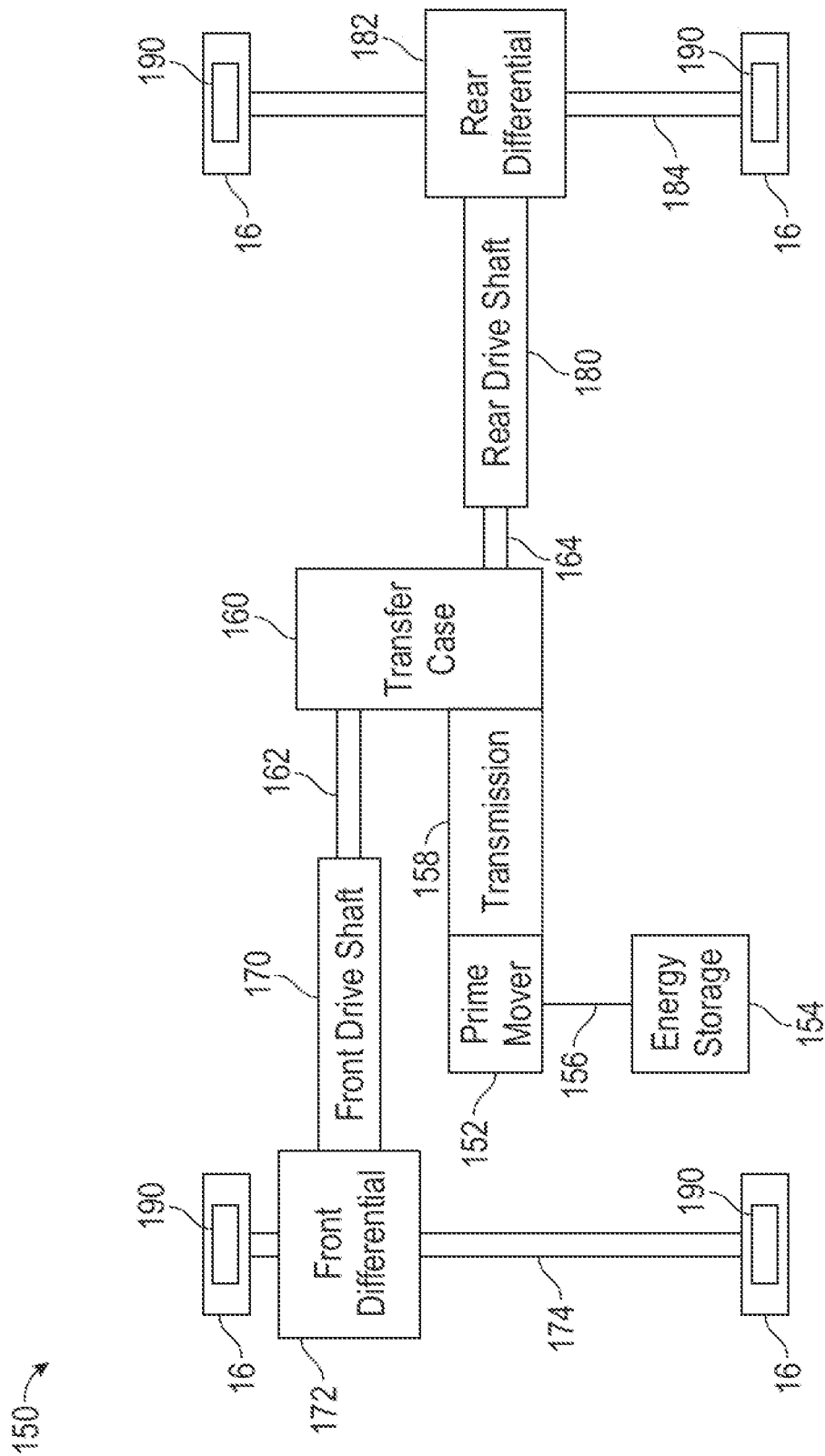
FIG. 7 is a schematic diagram of a driveline of a vehicle or machine, according to an exemplary embodiment.

As shown in FIGS. 1-6, the driveline 150 is coupled to the frame 12. According to an exemplary embodiment, the driveline 150 is configured to provide power to the wheel and tire assemblies 16 and/or to other systems of the vehicle 10 (e.g., a pneumatic system, a hydraulic system, a pump system, etc.). As shown in FIG. 7, the driveline 150 includes a primary driver, shown as prime mover 152, and an energy storage device, shown as energy storage 154, coupled to the prime mover 152 by an energy connector, shown as energy line 156. In some embodiments, the driveline 150 is a conventional driveline whereby the prime mover 152 is an internal combustion engine, the energy storage 154 is a fuel tank, and the energy line 156 is a fuel line. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 150 is an electric driveline whereby the prime mover 152 is an electric motor, the energy storage 154 is a battery system, and the energy line 156 is an electrical line. In some embodiments, the driveline 150 is a fuel cell electric driveline whereby the prime mover 152 is an electric motor, the energy storage 154 is a fuel cell (e.g., that stores hydrogen, that produces electricity from the hydrogen, etc.), and the energy line 156 is an electrical line. In some embodiments, the driveline 150 is a hybrid driveline (e.g., a series hybrid driveline, a parallel hybrid driveline, etc.) whereby (i) the prime mover 152 includes an internal combustion engine and an electric motor/generator, (ii) the energy storage 154 includes a fuel tank and/or a battery system, and (iii) the energy line 156 includes a fuel line and/or an electrical line.

As shown in FIG. 7, the driveline 150 includes a transmission device (e.g., a gearbox, a continuous variable transmission ("CVT"), etc.), shown as transmission 158, coupled to the prime mover 152. According to an exemplary embodiment, the transmission 158 is configured to receive an input from the prime mover 152 and provide an output to the other components of the driveline 150. According to an exemplary embodiment, the transmission 158 has a variety of configurations (e.g., gear ratios, etc.) and provides different output speeds relative to an input received thereby from the prime mover 152.

As shown in FIG. 7, the driveline 150 includes a power divider, shown as transfer case 160, coupled to the transmission 158; a first drive shaft, shown as front drive shaft 170, coupled to a first or front output 162 of the transfer case 160; a first differential, shown as front differential 172, coupled to the front drive shaft 170; a first axle, shown as front axle 174, coupled to the front differential 172 and front wheel and tire assemblies 16; a second drive shaft, shown as rear drive shaft 180, coupled to a second or rear output 164 of the transfer case 160; a second differential, shown as rear differential 182, coupled to the rear drive shaft 180; and a second axle, shown as rear axle 184, coupled to the rear differential 182 and rear wheel and tire assemblies 16. In some embodiments, the driveline 150 includes a pair of front axles 174 and/or a pair of rear axles 184.

According to an exemplary embodiment, the transfer case 160 is configured to facilitate driving both the front axle 174 and the rear axle 184 with the prime mover 152 to provide front and rear drive (e.g., an all-wheel-drive vehicle, a four-wheel-drive vehicle, etc.). In some embodiments, the transfer case 160 facilitates selectively engaging rear drive only, front drive only, and both front and rear drive simultaneously. In some embodiments, the transmission 158 and/or the transfer case 160 facilitate selectively disengaging the front axle 174 and the rear axle 184 from the prime mover 152 (e.g., in a neutral mode of operation). In some embodiments (e.g., in electric driveline configurations, in hybrid driveline configurations, etc.), the driveline 150 does not include the transmission 158. In such embodiments, the prime mover 152 may be directly coupled to the transfer case 160. In some embodiments, the driveline 150 does not include the transfer case 160. In such embodiments, the prime mover 152 or the transmission 158 may directly drive the front drive shaft 170 (i.e., a front-wheel-drive vehicle) or the rear drive shaft 180 (i.e., a rear-wheel-drive vehicle). In some embodiments, the driveline 150 does not include the front drive shaft 170 or the front differential 172 (e.g., a rear-wheel-drive vehicle). In some embodiments, the driveline 150 does not include the rear drive shaft 180 or the rear differential 182 (e.g., a front-wheel-drive vehicle). In some embodiments, the driveline 150 includes a plurality of prime movers 152 (e.g., electric motors) positioned to drive two or more of the wheel and tire assemblies 16 directly (e.g., the driveline 150 does not include the transmission 158, the transfer case 160, etc.).

As shown in FIG. 7, the driveline 150 includes a plurality of braking assemblies, shown as brakes 190. According to an exemplary embodiment, the brakes 190 are controllable to facilitate braking, slowing, stopping, etc. the vehicle 10. The brakes 190 may include wheel brakes and/or a parking brake. In one embodiment, the brakes 190 include disc brakes. In another embodiment, the brakes include drum brakes. In some embodiments, the brakes 190 additionally or alternatively include a regenerative braking system to supplement or replace traditional mechanical braking mechanisms.

Figure 8:
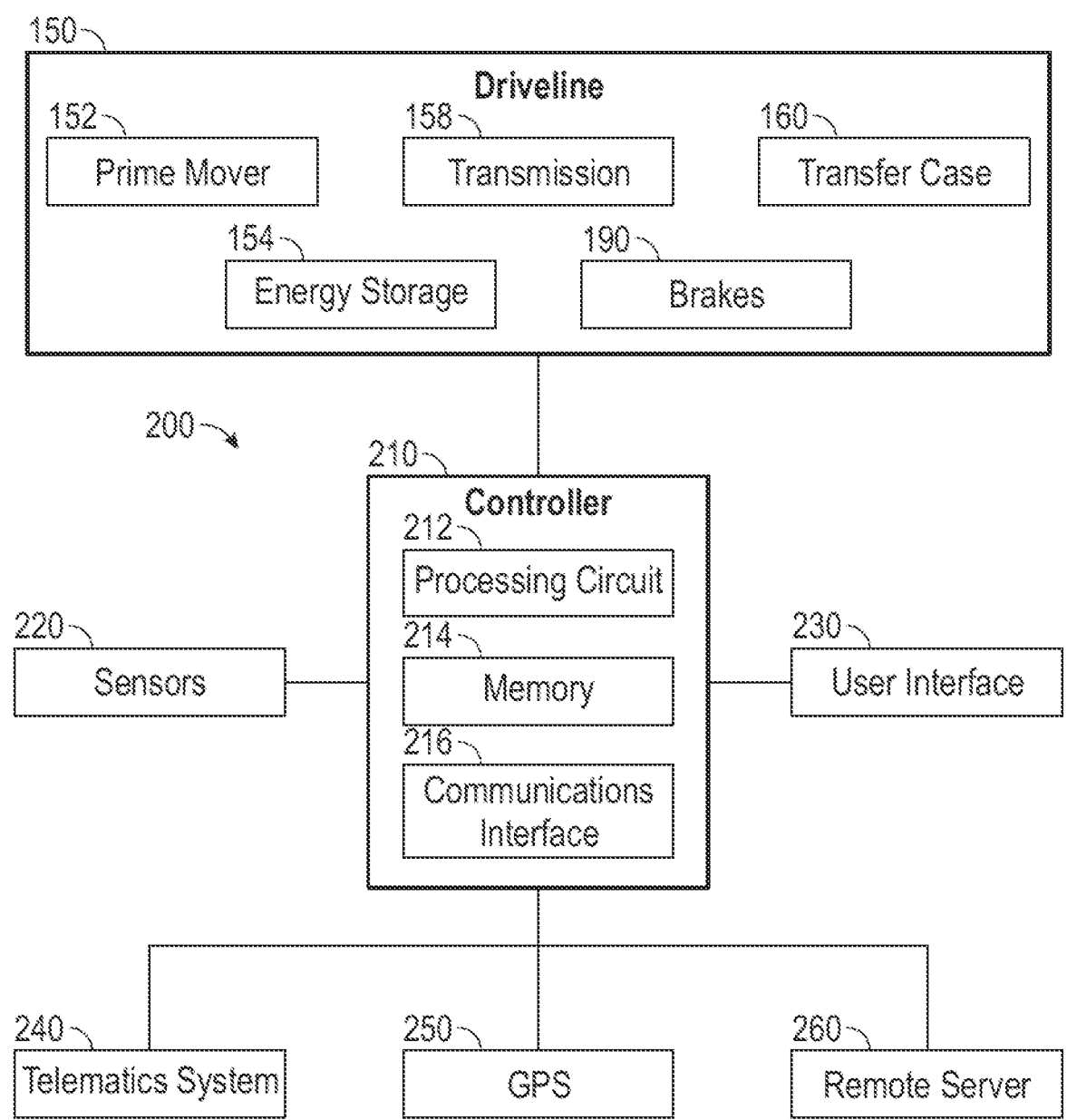
FIG. 8 is a schematic diagram of a control system of a vehicle or machine, according to an exemplary embodiment.

According to the exemplary embodiment shown in FIG. 8, the control system 200 includes a controller 210. In one embodiment, the controller 210 is configured to selectively engage, selectively disengage, control, or otherwise communicate with components of the vehicle 10 and one or more external/remote systems. As shown in FIG. 8, the controller 210 is coupled to (e.g., communicably coupled to) components of the driveline 150 (e.g., the prime mover 152, the energy storage 154, the transmission 158, the transfer case 160, the brakes 190, etc.); one or more sensors, shown as sensors 220; a user input/output device, shown as user interface 230; a first external system, shown as telematics system 240; a second external system, shown as global positioning system ("GPS") 250; and a third external system, shown as remote server 260. By way of example, the controller 210 may send and receive signals (e.g., control signals) with the components of the driveline 150, the sensors 220, the user interface 230, the telematics system 240, the GPS 250, and/or the remote server 260.

The controller 210 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 8, the controller 210 includes a processing circuit 212, a memory 214, and a communications interface 216. The processing circuit 212 may include an ASIC, one or more FPGAs, a DSP, circuits containing one or more processing components, circuitry for supporting a microprocessor, a group of processing components, or other suitable electronic processing components. In some embodiments, the processing circuit 212 is configured to execute computer code stored in the memory 214 to facilitate the activities described herein. The memory 214 may be any volatile or non-volatile computer-readable storage medium capable of storing data or computer code relating to the activities described herein. According to an exemplary embodiment, the memory 214 includes computer code modules (e.g., executable code, object code, source code, script code, machine code, etc.) configured for execution by the processing circuit 212.

According to an exemplary embodiment, the communications interface 216 is configured to facilitate wired and/or wireless communication between the controller 210 and the components of the driveline 150, the sensors 220, the user interface 230, the telematics system 240, the GPS 250, and the remote server 260. The communications interface 216 may be a standalone component or integrated into the controller 210. The communications interface 216 may employ any suitable wired or wireless communication protocols (e.g., Wi-Fi, cellular, radio, Bluetooth, near-field communication, etc.) to facilitate wired or wireless communication between the controller 210 and the components of the driveline 150, the sensors 220, the user interface 230, the telematics system 240, the GPS 250, and the remote server 260.

As shown in FIG. 2, the sensors 220 are variously positioned about the vehicle 10. While the sensors 220 are only shown in FIG. 2, it should be understood that the vehicle 10 in FIGS. 1 and 3-6, may additionally include the sensors 220. In some embodiments, the sensors 220 include one or more sensors that are configured to acquire sensor data regarding various components of the vehicle 10 to facilitate monitoring operational parameters/characteristics of the various components of the vehicle 10 with the controller 210. By way of example, the sensors 220 may include one or more prime mover sensors (e.g., a speed sensor, an exhaust gas sensor, a $NO_x$ sensor, an 02 sensor, etc.) that are configured to facilitate monitoring operational parameters/characteristics of the prime mover 152 (e.g., output speed, output power, output torque, exhaust gas composition, $NO_x$ levels, $O_2$ levels, etc.). By way of another example, the sensors 220 may additionally or alternatively include one or more transmission sensors that are configured to facilitate monitoring operational parameters/characteristics of the transmission 158 (e.g., input speed, output speed, current gear selection, etc.). By way of still another example, the sensors 220 may additionally or alternatively include one or more energy storage sensors (e.g., voltage sensors, current sensors, state-of-charge ("SoC") sensors, fuel level sensors, etc.) that are configured to facilitate monitoring operational parameters/characteristics of the energy storage 154 (e.g., voltage, current, and/or power of incoming power; voltage, current, and/or power being output to the electrically-operated components of the vehicle 10; a SoC of the energy storage 154; a fuel level within the energy storage 154; etc.).

In some embodiments, the sensors 220 include an accelerometer, an incline sensor, a gyroscope, a collision detection sensor, and/or still other suitable sensors to acquire sensor data regarding an acceleration or G-force that the vehicle 10 is experiencing (e.g., a high speed turn, a collision, etc.), an orientation of the vehicle 10 (e.g., a tip-over or overturn condition, not on its wheels, etc.), etc. to facilitate monitoring such characteristics/conditions of the vehicle 10 with the controller 210. In some embodiments, the sensors 220 include a windshield wiper sensor configured to acquire sensor data to facilitate detecting whether the windshield wipers of the vehicle 10 are on or off. In some embodiments, the sensors 220 include a seat belt sensor configured to acquire sensor data to facilitate detecting whether the operator and/or passengers of the vehicle 10 are wearing a seatbelt. In some embodiments, the sensors 220 include a chain sensor configured to acquire sensor data to facilitate detecting whether chains are on the wheel and tire assemblies 16 and/or whether the chains have been removed from a respective chain compartment on the vehicle 10 (e.g., indicating that the chains have been or are being put on). In some embodiments, the sensors 220 includes one or more sensors configured to acquire sensor data to facilitate monitoring operator attentiveness and/or consciousness.

In some embodiments, the sensors 220 include one or more sensors that are configured to acquire sensor data regarding a surrounding area around the vehicle to facilitate monitoring the surrounding area around the vehicle 10 with the controller 210. By way of example, the sensors 220 may include cameras, proximity sensors, a radar, a lidar, temperature sensors, humidity sensors, rain/snow sensors, etc. that facilitate monitoring the surrounding environment including proximate vehicles (e.g., approaching response vehicles, pulled over vehicles, accidents, etc.), proximate pedestrians, speed limit signs, stop light status (e.g., green, yellow, red), upcoming road characteristics (e.g., curvatures, intersections, etc.), weather conditions (e.g., snow, rain, ice, wet roads, etc.), and the like. In some embodiments, the controller 210 is configured to automatically change a mode of operation for the driveline 150 and/or make a recommendation to an operator via the user interface 230 to approve a change to the mode of operation of the driveline 150 based on the telematics data, the GPS data, and/or the sensor data.

According to an exemplary embodiment, the user interface 230 is positioned within the interior 22 of the cab 20, on the platform assembly 116 of the boom 110, and/or on the platform 132 of the lift assembly 130. The display may include a display and an operator input. The display may be configured to display a graphical user interface, an image, an icon, or still other information. In one embodiment, the display includes a graphical user interface configured to provide general information about the vehicle 10 (e.g., vehicle speed, fuel level, battery level, transmission gear selection, external temperature, GPS information, etc.). The graphical user interface may also be configured to display alerts, warnings, and/or notifications regarding suggested/recommend operation of the vehicle 10 and/or suggested/recommend actions to be performed by the operator.

The operator input may be used by an operator to provide commands to various components of the vehicle 10 including the driveline 150 and/or still other components or systems of the vehicle 10. The operator input may include one or more additional buttons, knobs, touchscreens, switches, levers, joysticks, pedals, or handles. The operator may be able to manually control some or all aspects of the operation of the driveline 150 and/or other components of the vehicle 10 using the display and the operator input. It should be understood that any type of display or input controls may be implemented with the systems and methods described herein. According to an exemplary embodiment, the operator input of the user interface 230 includes an operator override (e.g., switch, lever, button, selectable button on a touchscreen, etc.) that permits an operator to override or prevent the controller 210 from performing one or more of the automatic control functions described herein.

The telematics system 240 may be a server-based system that monitors various telematics information and provides telematics data based on the telematics information to the controller 210 of the vehicle 10. The GPS 250 may similarly be a server-based system that monitors various GPS information and provides GPS data based on the GPS information to the controller 210 of the vehicle 10. The telematics data may include details regarding the surrounding and upcoming environment of the vehicle 10 including road type, speed limit, road curvature, intersections, train crossings, weather conditions, etc. The GPS data may include an indication of a current location of the vehicle 10 and/or similar data as the telematics data. The GPS data and/or the telematics data may additionally or alternatively include traffic information, long-term geofences (e.g., a high-risk accident area geofence, a blind-spot geofence, a school zone geofence, a neighborhood geofence, etc.) or short-term geofences (e.g., a construction zone geofence, an accident zone geofence, a scene or site geofence, etc.). The predetermined geofences may be defined by the operator and stored by the telematics system 240 and/or the GPS 250 for indefinite use. The short-term geofences may be defined by the Department of Transportation, by drivers on the road passing, for example, an accident or construction zone (e.g., through the Waze, Apple Maps, Google Maps, etc. GPS applications), and/or by the operator of the vehicle 10 or a fleet manager of the vehicle 10 (e.g., via the user interface 230, through the remote server 260, etc.) and may only last for a short period of time (e.g., until the construction zone, accident zone, etc. is cleared). The controller 210 may receive or acquire the telematics data and/or the GPS data from the telematics system 240 and/or GPS 250 on a periodic basis, automatically, upon request, and/or in another suitable way. The sensor data, the telematics data, and/or the GPS data may be utilized by the controller 210 to perform one or more functions described herein. In some embodiments, the telematics system 240 and the GPS 250 are integrated into a single system.

The remote server 260 is a server-based system that communicates with the controller 210. In some embodiments, one or more of the functions of the controller 210 described herein may be performed by the remote server 260 and commands may be communicated by the remote server 260 to the controller 210 for implementation. In some embodiments, one or more of the functions of the controller 210 described herein are performed by both the controller 210 and the remote server 260 in cooperation. The remote server 260 may be configured to function as a fleet management server that distributes user configurable settings regarding desired operation of a plurality of the vehicles 10 in a fleet including user configurable geofences (e.g., the long-term geofences, the short-term geofences, etc.) and/or user configurable thresholds (e.g., speed thresholds, acceleration thresholds, gear thresholds, etc.). In addition or alternatively, the user configurable settings may by input by an operator of the vehicle 10 using the user interface 230.

According to an exemplary embodiment, the controller 210 is configured to (i) acquire or receive the sensor data, the telematics data, the GPS data, and/or the user configurable settings and (ii) monitor one or more conditions regarding the vehicle 10 based on the sensor data, the telematics data, and/or the GPS data. The one or more conditions may be or include (i) vehicle operation conditions, (ii) operational status conditions, (iii) surrounding conditions, and/or (iv) operator conditions. The vehicle operation conditions may be or includes conditions regarding the operation of the vehicle 10 including vehicle location, vehicle speed, vehicle acceleration (or deceleration), vehicle orientation, and/or the like. The operational status conditions may be or includes windshield wiper status (e.g., whether the windshield wipers are ON or OFF), chains status (e.g., whether the tire chains are ON or OFF), lights status (e.g., whether the response lights of a response vehicle (fire truck, ambulance, police vehicle, etc.) are ON or OFF), response status (e.g., whether the vehicle 10 is in a response mode or in a non-response mode), load status (e.g., whether the vehicle 10 is loaded (with refuse or cement) or is unloaded), hazard lights status (e.g., whether the hazard lights are ON or OFF), airbag status (e.g., whether airbags have been deployed or have not been deployed), and/or the like. The surrounding conditions may be or include weather conditions (e.g., rain, snow, sunny, etc.), road conditions (e.g., wet, icy, dry, etc.), road curvature, speed limits, upcoming intersections, upcoming stop light status (i.e., green, yellow, or red), upcoming railroad crossings, constructions zones, accident zones, scene or site zones, traffic conditions, approaching response vehicles, pulled over vehicles, upcoming geofences (e.g., whether or not the vehicle 10 is in or approaching a geofence), and/or the like. The operator conditions may be or include seatbelt buckle status (e.g., whether a seatbelt is buckled or unbuckled), operator attentiveness (e.g., drowsy, eyes closed, eyes looking away from the road, etc.), operator consciousness (e.g., whether the operator may have sustained an injury to render him or her unconscious during, for example, an accident or collision), and/or the like.

According to an exemplary embodiment, the controller 210 is configured to (i) control operation of the driveline 150 and/or (ii) provide alerts, warnings, and/or notifications via the user interface 230 regarding suggested/recommended operation of the vehicle 10 and/or suggested/recommended actions to be performed by the operator based on (a) the one or more conditions and/or (b) the user configurable settings. Various examples of such condition based control and functions of the controller 210 are provided below.

Driveline Isolation

According to an exemplary embodiment, the controller 210 is configured to shut down the driveline 150 and/or isolate various components of the driveline 150 based on the one or more conditions.

Overturn Condition

The controller 210 may be configured to monitor for an overturn condition indicating the vehicle 10 has overturned, tipped, rolled, etc. and control various components of the driveline 150 to enter the vehicle 10 into an overturn mode in response to the overturn condition. By way of example, if the prime mover 152 is or includes an engine, the controller 210 may be configured to (i) engage a valve along the energy line 156 (i.e., fuel line) to stop the flow of fuel out of and isolate the energy storage 154 (i.e., fuel tank), (ii) command the prime mover 152 (i.e., engine) to a zero output and shut the prime mover 152 off, (iii) shift the transmission 158 to a neutral gear, and/or (iv) engage the parking brake of the brakes 190. By way of another example, if the prime mover 152 is or includes an electric motor, the controller 210 may be configured to (i) isolate electrical contacts along the energy line 156 (i.e., electrical line) to stop the flow of electricity out of and isolate the energy storage 154 (i.e., battery), (ii) command the prime mover 152 (i.e., electric motor) to a zero output and shut the prime mover 152 off, and/or (iii) engage the parking brake of the brakes 190.

Accident Condition

The controller 210 may be configured to monitor for an accident condition indicating that the vehicle 10 has been involved in an accident or collision (e.g., the vehicle 10 has hit an object, the vehicle 10 has been hit, the airbags have deployed, a significant/substantial deceleration detected, significant G-forces detected, etc.) and control various components of the driveline 150 to enter the vehicle 10 into an accident mode in response to the accident condition. By way of example, if the prime mover 152 is or includes an engine, the controller 210 may be configured to (i) engage a valve along the energy line 156 (i.e., fuel line) to stop the flow of fuel out of and isolate the energy storage 154 (i.e., fuel tank), (ii) command the prime mover 152 (i.e., engine) to a zero output and shut the prime mover 152 off, (iii) shift the transmission 158 to a neutral gear, and/or (iv) engage the parking brake of the brakes 190. By way of another example, if the prime mover 152 is or includes an electric motor, the controller 210 may be configured to (i) isolate electrical contacts along the energy line 156 (i.e., electrical line) to stop the flow of electricity out of and isolate the energy storage 154 (i.e., battery), (ii) command the prime mover 152 (i.e., electric motor) to a zero output and shut the prime mover 152 off, and/or (iii) engage the parking brake of the brakes 190. The controller 210 may be further configured to monitor operator conditions (e.g., attentiveness, consciousness, etc.) and identify whether the operator is capable of operating the vehicle 10 before allowing the operator to disengage the accident mode (e.g., to release the parking brake, shift the transmission 158, start the prime mover 152, etc.) and permitting the vehicle 10 to be driven by the operator.

Speed Control

According to an exemplary embodiment, the controller 210 is configured to control various components of the driveline 150 to control or limit a speed of the vehicle 10 based on the one or more conditions and/or the user configurable settings. In some embodiments, the controller 210 provides recommendations (e.g., to engage the brakes 190, to release an accelerator pedal, to downshift the transmission 158, etc.) via the user interface 230 for manual implementation by the operator or for approval by the operator before implementation by the controller 210. The controller 210 may be configured to control or limit the speed of the vehicle 10 by (i) engaging the brakes 190 to slow the vehicle 10 (e.g., if over a respective speed threshold), (ii) preventing an upshift of the transmission 158 (e.g., if approaching a respective speed threshold), (iii) forcing a downshift of the transmission 158 (e.g., if over a respective speed threshold), (iv) limiting the output of the prime mover 152 to limit the speed/acceleration of the vehicle 10 (e.g., up to a respective speed/acceleration threshold), and/or (iv) limiting the throttle response to limit the speed/acceleration of the vehicle 10. In some embodiments, the operator is able to override the speed control or speed limiting functionality of the controller 210 by engaging the operator override of the user interface 230. The controller 210 may be configured to document or log such overrides and/or provide a notification to the remote server 260 to perform such logging.

Seatbelt Buckle Condition

The controller 210 may be configured to monitor for a seatbelt buckle condition indicating that the operator and/or one or more passengers of the vehicle 10 are not buckled in. The controller 210 may be configured to (i) provide an alert via the user interface 230 regarding the unbuckled occupant and/or (ii) limit the speed of the vehicle 10 to an unbuckled speed threshold (e.g., 5, 10, 15, etc. mph), apply the brakes 190, and/or limit the maximum gear of the transmission 158 to an unbuckled gear threshold (e.g., first gear, second gear, etc.) until all occupants are buckled. Such a feature may ensure that all occupants are properly buckled in before the vehicle 10 reaches increased speeds.

Attentiveness Condition

The controller 210 may be configured to monitor for an attentiveness condition indicating that the operator of the vehicle 10 is not being attentive to the road (e.g., drowsy, eyes closed, eyes looking away from the road, distracted, etc.). The controller 210 may be configured to (i) provide an alert via the user interface 230 regarding the inattentive operator (e.g., so that the operator becomes more attentive, etc.) and/or (ii) limit the speed of the vehicle 10 to an inattentive speed threshold, apply the brakes 190, and/or prevent further acceleration of the vehicle 10.

Tire Chains Condition

The controller 210 may be configured to monitor for a tire chains condition indicating (i) that tire chains have been put on the tires of the vehicle 10 (e.g., based on a user input indicating that the tire chains are on, a sensor detecting that the chains are not in a designated vehicle compartment, etc.) or (ii) that an automatic tire chains system of the vehicle 10 is deployed (e.g., based on a user input to deploy the automatic tire chains system, etc.). In response to the tire chains condition, the controller 210 may be configured to limit the speed of the vehicle 10 to a tire chains speed threshold. In one embodiment, the tire chains speed threshold is a maximum speed (e.g., 25 mph, 35 mph, 50 mph, etc.). In another embodiment, the tire chains speed threshold is based on the speed limit where the vehicle 10 is located (e.g., the vehicle 10 is prevented from exceeding the speed limit, the vehicle 10 is maintained at least 5 mph below the speed limit, etc.).

Hazard Lights Condition

The controller 210 may be configured to monitor for a hazard lights condition indicating that hazard lights of the vehicle 10 are active (e.g., as a refuse vehicle drives along making refuse stops, as a delivery vehicle drives along making frequent deliveries, in response to the operator activating the hazard lights, etc.). In response to the hazard lights condition, the controller 210 may be configured to limit the speed of the vehicle 10 to a hazard light speed threshold. In one embodiment, the hazard lights speed threshold is a maximum speed (e.g., 5 mph, 10 mph, etc.).

Adverse Weather Condition

The controller 210 may be configured to monitor for an adverse weather condition indicating that the ambient conditions (e.g., rain, snow, icy roads, cold temperatures, etc.) may be adverse to normal driving habits. The controller 210 may detect the adverse weather condition based on readings from the sensors 220, based on weather information in the telematics data, and/or in response to the windshield wipers being turned on. In response to the adverse weather condition, the controller 210 may be configured to (i) provide an alert via the user interface 230 regarding the adverse weather condition (e.g., slippery/icy conditions, proceed with caution, reduce speed, etc.) and/or (ii) limit the speed of the vehicle 10 to an adverse weather speed threshold. In one embodiment, the adverse weather speed threshold is based on the speed limit where the vehicle 10 is located (e.g., the vehicle 10 is prevented from exceeding the speed limit, the vehicle 10 is maintained at least 5 mph below the speed limit, the vehicle 10 is prevented from exceeding the speed limit by more than 5 mph, etc.). In some embodiments, the adverse weather speed threshold adapts to the severity of the weather and/or is different for different weather conditions (e.g., rain versus snow, etc.).

Approaching Response Vehicle Condition

The controller 210 may be configured to monitor for an approaching response vehicle condition indicating that a response vehicle (e.g., a fire truck, an ambulance, a police vehicle, etc.) is approaching and in a response mode (e.g., sirens on, lights on, moving at a high rate of speed, etc.). In response to the approaching response vehicle condition, the controller 210 may be configured to (i) provide an alert via the user interface 230 regarding the approaching response vehicle (e.g., proceed slowly, pull over, reduce speed, etc.) and/or (ii) limit the speed of the vehicle 10 to an approaching response vehicle speed threshold until the response vehicle has passed by. In one embodiment, the approaching response vehicle speed threshold is based on the speed limit where the vehicle 10 is located (e.g., the vehicle 10 is prevented from exceeding the speed limit, the vehicle 10 is maintained at least 5 mph below the speed limit, etc.). In another embodiment, the approaching response vehicle threshold is a maximum speed independent of the speed limit (e.g., 5 mph, 10 mph, 0 mph, etc.). In some embodiments, the controller 210 is configured to provide an alert to the operator to manually pull over and stop, and intervene if the operator does not comply with the alert. In some embodiments, the controller 210 is configured to turn the vehicle 10 in addition to limiting the speed thereof to move the vehicle 10 out of the way of the approaching response vehicle. In some embodiments, the approaching response vehicle speed threshold depends on the current location of the vehicle 10 and the type of road the vehicle 10 is on. By way of example, the controller 210 may be configured to implement a first speed threshold (e.g., 5, 10, etc. mph under the speed limit, etc.) if the vehicle 10 is on a multi-lane highway and implement a second speed threshold (e.g., a max speed of 5 mph, 0 mph, etc.) if the vehicle 10 is on a residential road, city road, etc. (and the vehicle 10 has been maneuvered out of the way).

Hazard Condition

The controller 210 may be configured to monitor for a hazard condition indicating that the vehicle 10 is approaching a road hazard (e.g., a pulled over vehicle, an accident, a construction zone, etc.) (that is not accommodated for in a short-term geofence). In response to the hazard condition, the controller 210 may be configured to (i) provide an alert via the user interface 230 regarding the upcoming hazard (e.g., proceed slowly, move over, reduce speed, etc.) and/or (ii) limit the speed of the vehicle 10 to an hazard speed threshold until the vehicle 10 has passed the hazard. In one embodiment, the hazard speed threshold is based on the speed limit where the vehicle 10 is located (e.g., the vehicle 10 is prevented from exceeding the speed limit, the vehicle 10 is maintained at least 5-10 mph below the speed limit, etc.). In some embodiments, the controller 210 is configured to provide an alert to the operator to manually move over and slow down, and intervene if the operator does not comply with the alert. In some embodiments, the controller 210 is configured to turn the vehicle 10 in addition to limiting the speed thereof to move the vehicle 10 over and away from the hazard.

Upcoming Turn Condition

The controller 210 may be configured to monitor for an upcoming turn condition indicating that the vehicle 10 is approaching a turn in the road. In response to the upcoming turn condition, the controller 210 may be configured to (i) provide an alert via the user interface 230 regarding the upcoming turn (e.g., reduce speed, driving too fast for upcoming turn, etc.) and/or (ii) limit the speed of the vehicle 10 to a turn speed threshold until the vehicle 10 completes the turn. In one embodiment, the turn speed threshold is based on the speed limit at the turn, the characteristics of the turn (e.g., angle of road through turn, sharpness of turn, etc.), and/or the characteristics of the vehicle 10 (e.g., weight, height, length, center of gravity, etc.). In some embodiments, the turn speed threshold prevents the vehicle 10 from exceeding the speed limit or causes the vehicle 10 to reduce its speed (e.g., to the speed limit if already over the speed limit, to a speed below the speed limit if necessary based on vehicle characteristics, etc.). In some embodiments, the controller 210 is configured to provide an alert to the operator to reduce speed for the upcoming turn, and intervene if the operator does not comply with the alert (e.g., to prevent an overturn condition, an accident condition, etc.).

Service/Pre-Operation Check Condition

The controller 210 may be configured to monitor for a service condition indicating that a component of the vehicle 10 may be faulty or a pre-operation check condition indicating that the operator of the vehicle 10 failed to perform and complete an inspection or check of the vehicle 10 prior to departing. In response to the service condition or the pre-operation condition, the controller 210 may be configured to (i) provide an alert via the user interface 230 regarding the service condition and/or the pre-operation check condition and/or (ii) limit the speed of the vehicle 10 to a service speed threshold or a pre-operation check speed threshold. The service speed threshold may be based on a speed at which the vehicle 10 can be operated safely (e.g., based on the severity of the service condition, etc.). The pre-operation check speed threshold may prevent the vehicle 10 from reaching a sufficient operating speed (e.g., a limp mode, etc.) until the pre-check is completed. In some embodiments, the controller 210 is configured to direct the operator of the vehicle 10 to a link for a respective form that needs to filled out to complete the pre-operation check (e.g., on an application of the operator's own device, a link in an email to the operator's email address, on the user interface 230, etc.). The respective form that needs to be filled out may be based on the location of the vehicle 10. The controller 210 may be configured to remove the pre-operation check speed threshold upon successful inspection of the vehicle 10 and completion of the respective form by the operator.

Loaded Condition

The controller 210 may be configured to monitor for a loaded condition indicating that the vehicle 10 has been loaded (e.g., the drum assembly 50 is loaded with cement, the refuse compartment 40 is loaded with refuse, etc.). The controller 210 may be configured to limit the speed and/or acceleration of the vehicle 10 differently based on whether the loaded condition is present or not. By way of example, the controller 210 may be configured to implement an unloaded speed threshold when the vehicle 10 is unloaded and implement a loaded speed threshold when the vehicle 10 is loaded. In some embodiments, the speed threshold for the vehicle 10 is adjusted between the unloaded speed threshold and the loaded speed threshold based on the capacity of the vehicle 10 and how loaded the vehicle 10 is (e.g., 0% full, 25% full, 50% full, 75% full, 100% full, etc.). According to an exemplary embodiment, the unloaded speed threshold is higher than the loaded speed threshold. The unloaded speed threshold and the loaded speed threshold may be based on the speed limit at the current location of the vehicle 10. By way of example, the unloaded speed threshold may be selected such that the vehicle 10 can exceed the speed limit (e.g., by 5 mph, 10 mph, etc.) and the unloaded speed threshold may be selected such that the vehicle 10 cannot exceed the speed limit, is maintained below the speed limit, or can exceed the speed limit but by a lesser amount than when the vehicle 10 is not loaded. Similarly, the acceleration of the vehicle 10 may be limited when the loaded condition is present so at to prevent contents within the vehicle 10 (e.g., refuse, cement, etc.) from spilling from the vehicle 10.

Response Condition

The controller 210 may be configured to monitor for a response condition indicating that the vehicle 10 is in a response mode (e.g., lights are on, siren is on, a response mode is selected, etc.). The controller 210 may be configured to limit the speed and/or acceleration of the vehicle 10 differently based on whether the response condition is present or not. By way of example, the controller 210 may be configured to implement a response speed threshold when the vehicle 10 is in a response mode and implement a non-response speed threshold when the vehicle 10 is not in the response mode. According to an exemplary embodiment, the response speed threshold is higher than the non-response speed threshold. The response speed threshold and the non-response speed threshold may be based on the speed limit at the current location of the vehicle 10. By way of example, the non-response speed threshold may be selected such that the vehicle 10 can exceed the speed limit by a first amount (e.g., by 5 mph, 10 mph, etc.) and the response speed threshold may be selected such that the vehicle 10 can exceed the speed limit by a second amount greater than the non-response speed threshold (e.g., 20 mph, 30 mph, etc.). Similarly, the acceleration of the vehicle 10 may be controlled differently based on whether the response condition is present. For example, the acceleration of the vehicle 10 may not be limited when the response condition is present, while the acceleration of the vehicle 10 may be limited when the response condition is not present.

Geofence Condition

The controller 210 may be configured to monitor for a geofence condition indicating that the vehicle 10 is in a respective geofence. As described above, the respective geofence may be a long-term geofence or a short-term geofence. The long-term geofences may include a high-risk accident area geofence corresponding to an area where many accidents have been recorded (e.g., a complicated intersection, a train crossing, high congestion areas, etc.), a blind-spot geofence corresponding to an area where an operator of the vehicle 10 may have difficulty maneuvering or seeing other vehicles, a school zone geofence corresponding to an area proximate a school, and/or a neighborhood geofence correspondence to an area around a neighborhood, among other possible geofences. The short-term geofences may include a construction zone geofence corresponding to an area around a temporary construction zone (e.g., along a highway, on the street, etc.), an accident zone geofence correspondence to an area around an accident, and/or a scene or site geofence corresponding to a scene (e.g., a fire scene, a crime scene, etc.) or a site (e.g., a cement delivery site, etc.) to which the vehicle 10 is responding or making a delivery, among other possible geofences.

The controller 210 may be configured to limit the speed of the vehicle 10 to a geofence speed threshold corresponding to the respective geofence when the vehicle 10 is within the respective geofence. In one embodiment, the geofence speed threshold limits the speed of the vehicle 10 to the speed limit (e.g., in a school zone, in a neighborhood, etc.). In another embodiment, the geofence speed threshold limits the speed of the vehicle 10 to a speed less than the speed limit (e.g., in a construction zone, an accident zone, etc.). In other embodiments, the geofence speed threshold is independent of the speed limit (e.g., at a scene, site, etc.). By way of example, the vehicle 10 may be within a site geofence that is not on a road (e.g., a large construction site or other off-road site). The geofence speed threshold in this instance may be defined by the site manager, fleet manager, and/or still another person. In some embodiments, the controller 210 is configured to turn off one or more vehicle functions when the vehicle 10 is within the respective geofence. By way of example, the controller 210 may be configured to turn off a lane-keep-assist function of the vehicle 10 when the vehicle 10 is within a scene geofence to permit maneuverability about a scene without providing visual, audible, and/or haptic feedback to the operator to try and maintain the vehicle 10 within a respective lane.

While the various conditions herein have been described individually, the controller 210 may be configured to monitor for two or more of the conditions simultaneously and choose to address one condition over the other condition(s). By way of example, the vehicle 10 may be in a response mode such that the response condition is present. As such, the controller 210 may be configured to limit the speed of the vehicle 10 based on the response speed threshold. However, during the response condition, the vehicle 10 may enter a respective geofence (e.g., a high-risk accident area geofence, etc.) such that the response condition and the geofence condition are both present simultaneously. In one embodiment, the controller 210 may be configured to implement the speed threshold that limits the vehicle speed more. In the above instance, the controller 210 may be configured to apply the geofence speed threshold while the vehicle 10 is inside the respective geofence and then revert back to the response speed threshold once the vehicle 10 exits the geofence. Though, the operator may be able to override or decline such control, as described above, if the speed control is over-limiting.

Lights/Siren Control

According to an exemplary embodiment, the controller 210 is configured to control a light system and/or sirens (e.g., emergency/response lights and/or sirens on a firetruck, ambulances, police vehicle, etc.) on the vehicle 10 based on the one or more conditions. The controller 210 may be configured to variably control the light system and/or siren of the vehicle 10 when (i) the vehicle 10 is in a response mode (or other mode where the light system and/or sirens are used) and (ii) based on the location of the vehicle 10. By way of example, the controller 210 may be configured to maintain the sirens off during the response mode but blip the sirens or activate the sirens as the vehicle 10 approaches and/or drives through an intersection or a high-risk area (e.g., a location where a stop light or stop sign is present, determined based on the GPS data, determined based on the telematics data, determined based on an intersection geofence, determined based on a high-risk accident area geofence, etc.). By way of another example, the controller 210 may be configured to activate the sirens during the response mode and automatically change a characteristic of the sirens (e.g., tone, sound, volume, frequency, etc.) when the vehicle 10 approaches and/or drives through the intersection or the high-risk area. By way of yet another example, the controller 210 may be configured to activate the light system during the response mode and automatically change a characteristic of the light system (e.g., color, intensity, frequency, pattern, activate more lights of the light system, etc.) when the vehicle 10 approaches and/or drives through the intersection or the high-risk area.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein.

The invention claimed is:

1. A vehicle comprising:
   a chassis;
   a driveline coupled to the chassis;
   a light system;
   a siren; and
   a control system configured to:
   monitor a condition of at least one of the vehicle, an area around the vehicle, or an operator of the vehicle;
   limit a speed at which the driveline drives the vehicle based on the condition, wherein the condition includes at least one of:
   (a) a tire chain condition indicated by tire chains being installed on wheels of the vehicle or an automatic tire chain system of the vehicle being deployed;
   (b) a hazard lights condition indicated by hazard lights of the vehicle being active; or
   (c) an adverse weather condition indicated by windshield wipers of the vehicle being active;
   monitor a location of the vehicle;
   automatically control operation of at least one of the siren or the light system in a first manner in response to the location indicating that the vehicle is at least one of approaching or driving through an intersection or a high-risk area; and
   automatically control operation of the at least one of the siren or the light system in a second manner different than the first manner in response to the location indicating that the vehicle is at least one of approaching or driving through another location that is not the intersection or the high-risk area.

2. The vehicle of claim 1, wherein the condition is a first condition, further comprising a prime mover and an energy storage, and wherein the control system is configured to isolate the energy storage and shut off the prime mover in response to a second condition including at least one of an overturn condition indicating the vehicle has turned over or an accident condition indicating that the vehicle has been involved in an accident.

3. The vehicle of claim 2, wherein the control system is configured to at least one of shift a transmission of the vehicle to neutral or engage a parking brake of the vehicle in response to the overturn condition or the accident condition.

4. The vehicle of claim 2, wherein the condition includes the accident condition and an operator condition, and wherein the control system is configured to identify whether the operator is capable of operating the vehicle following the accident and before permitting the vehicle to be driven following the accident condition.

5. The vehicle of claim 2, wherein the prime mover includes at least one of an engine or an electric motor, wherein the energy storage includes at least one of a fuel tank or a battery, and wherein the control system is configured to at least one of (i) engage a valve to stop a flow of fuel out of the fuel tank or (ii) isolate electrical contacts to stop a flow of electricity out of the battery in response to the overturn condition or the accident condition.

6. The vehicle of claim 1, wherein the control system is configured to limit the speed at which the driveline drives the vehicle, further comprising an operator override configured to facilitate the operator with inputting an override command to override such limiting of the speed, and wherein the control system is configured to at least one of log the override or provide a notification regarding the override to an external system.

7. The vehicle of claim 1, wherein the condition includes a seatbelt buckle condition, and wherein the control system is configured to limit the speed in response to the seatbelt buckle condition indicating that an occupant of the vehicle is unbuckled.

8. The vehicle of claim 1, wherein the condition includes an attentiveness condition, and wherein the control system is configured to limit the speed in response to the attentiveness condition indicating that the operator of the vehicle is not being attentive to a road ahead of the vehicle.

9. The vehicle of claim 1, wherein the condition includes the tire chain condition.

10. The vehicle of claim 1, wherein the condition includes the hazard lights condition.

11. The vehicle of claim 1, wherein the condition includes the adverse weather condition.

12. The vehicle of claim 1, wherein the condition includes an approaching response vehicle condition, and wherein the control system is configured to limit the speed in response to the approaching response vehicle condition indicating that a response vehicle is approaching and in a response mode of operation.

13. The vehicle of claim 12, wherein the control system is configured to:
provide a notification to the operator of the vehicle to slow down or pull over in response to the approaching response vehicle condition; and
limit the speed of the vehicle and force the vehicle to pull over in response to the operator failing to comply with the notification.

14. The vehicle of claim 1, wherein the condition includes a pre-operation check condition, and wherein the control system is configured to limit the speed in response to the pre-operation check condition indicating that the operator failed to complete a vehicle inspection prior to departing.

15. The vehicle of claim 1, wherein the condition includes a loaded condition, and wherein the control system is configured to limit the speed in response to the loaded condition indicating that the vehicle has been loaded.

16. The vehicle of claim 1, wherein the condition includes a geofence condition, and wherein the control system is configured to limit the speed in response to the geofence condition indicating that the vehicle is in a speed-limited geofence.

17. The vehicle of claim 1, wherein the condition includes a response condition, and wherein the control system is configured to limit the speed based on whether the response condition indicates that the vehicle is in a response mode such that the vehicle can exceed a speed limit by a greater amount when the response mode is active relative to when the response mode is not active.

18. A vehicle comprising:
a chassis;
a light system;
a siren; and
a control system configured to:
    monitor a location of the vehicle;
    automatically control operation of at least one of the siren or the light system in a first manner in response to the location indicating that the vehicle is at least one of approaching or driving through an intersection or a high-risk area; and
    automatically control operation of the at least one of the siren or the light system in a second manner different than the first manner in response to the location indicating that the vehicle is at least one of approaching or driving through another location that is not the intersection or the high-risk area.

19. A vehicle comprising:
a chassis;
a driveline coupled to the chassis;
a light system;
a siren; and
a control system configured to:
monitor for a plurality conditions including two or more of an accident condition of the vehicle, an overturn condition of the vehicle, a seatbelt buckle condition of an operator of the vehicle, an attentiveness condition of the operator, a tire chains condition of the vehicle, a hazard lights condition of the vehicle, an adverse weather condition around the vehicle, an approaching response vehicle condition proximate the vehicle, a hazard condition ahead of the vehicle, an upcoming turn condition ahead of the vehicle, a loaded condition of the vehicle, a response condition of the vehicle, a geofence condition around the vehicle, a service condition of the vehicle, or a pre-operation check condition of the vehicle;
control operation of the driveline based on the plurality of conditions by (i) selectively limiting a speed at which the driveline drives the vehicle in response to a first condition of the plurality of conditions being present and (ii) selectively shutting down the driveline and isolating a component of the driveline in response to a second condition of the plurality of conditions being present;
monitor a location of the vehicle;
automatically control operation of at least one of the siren or the light system in a first manner in response to the location indicating that the vehicle is at least one of approaching or driving through an intersection or a high-risk area; and
automatically control operation of the at least one of the siren or the light system in a second manner different than the first manner in response to the location indicating that the vehicle is at least one of approaching or driving through another location that is not the intersection or the high-risk area.

* * * * *